US006680594B2

(12) United States Patent
Collett et al.

(10) Patent No.: US 6,680,594 B2
(45) Date of Patent: Jan. 20, 2004

(54) CONTROL AND MOTORIZATION SYSTEM

(75) Inventors: Robert W. Collett, Golden, CO (US); Daniel A. Huber, Denver, CO (US); Steven J. Wolf, Lakewood, CO (US); Paul Y. Timmer, Hilversum (NL)

(73) Assignee: Techniku, Inc., Denver, CO (US)

( * ) Notice: Subject to any disclaimer, the term of this patent is extended or adjusted under 35 U.S.C. 154(b) by 0 days.

(21) Appl. No.: 10/137,946

(22) Filed: May 3, 2002

(65) Prior Publication Data

US 2002/0190678 A1 Dec. 19, 2002

Related U.S. Application Data

(60) Provisional application No. 60/288,552, filed on May 3, 2001, and provisional application No. 60/298,246, filed on Jun. 14, 2001.

(51) Int. Cl.[7] .............................. H02P 1/00; G05D 3/00; A47H 5/00; E06B 9/56

(52) U.S. Cl. ........................ 318/280; 318/434; 318/469; 160/84.02; 160/310

(58) Field of Search .............................. 160/84.02, 310; 318/434, 469, 65, 739, 280, 282

(56) References Cited

U.S. PATENT DOCUMENTS

| | | | | | |
|---|---|---|---|---|---|
| 5,531,257 | A | * | 7/1996 | Kuhar | 160/168.1 P |
| 5,775,619 | A | * | 7/1998 | Tabellini | 242/372 |
| 5,818,358 | A | * | 10/1998 | Torii et al. | 341/16 |
| 5,883,480 | A | * | 3/1999 | Domel et al. | 318/282 |
| 6,062,290 | A | * | 5/2000 | Domel | 160/176.1 V |
| 6,079,471 | A | * | 6/2000 | Kuhar | 160/170 |
| 6,116,320 | A | * | 9/2000 | Peterson | 160/84.02 |
| 6,149,094 | A | * | 11/2000 | Martin et al. | 242/373 |
| 6,230,785 | B1 | * | 5/2001 | Tokuyama et al. | 160/310 |
| 6,484,784 | B1 | * | 11/2002 | Weik et al. | 160/7 |
| 2003/0075283 | A1 | * | 4/2003 | Collett et al. | 160/84.02 |

* cited by examiner

*Primary Examiner*—Robert Nappi
*Assistant Examiner*—Patrick Miller
(74) *Attorney, Agent, or Firm*—Rader, Fishman & Grauer PLLC

(57) ABSTRACT

An apparatus for effecting and controlling the movement of a window covering member between different positions in response to a disturbance of the window covering. Also, an apparatus for assisting the manipulation of a window covering by way of potential energy stored in a spring. Also a torque sending device having a design that is insensitive to component tolerances.

8 Claims, 32 Drawing Sheets

CONTROL AND MOTORIZATION SYSTEM

CROSS-REFERENCE TO RELATED APPLICATIONS

This application claims priority to U.S. Provisional Application entitled "Control and Motorization System" filed May 3, 2001, Application No. 60/288,552 and U.S. Provisional Application entitled "Control and Motorization System" filed Jun. 14, 2001, Application No. 60/298,246.

A. 35 U.S.C. 119(e)

NOTE: "Any nonprovisional application claiming the benefit of one or more prior filed copending provisional applications must contain or be amended to contain in the first sentence of the specification following the title a reference to each such prior provisional application, identifying it as a provisional application, and including the provisional application number (consisting of series code and Ser. No. ). " 37 C.F.R. §1.78(a)(4).

FIELD OF THE INVENTION

The present Invention relates to the field of control and motorization systems. More particularly, the present Invention relates to novel and improved control and motorization systems for window shades, blinds, and other window treatments (collectively "window shade(s)" or "shade(s)") and other applications where control and motorization of a member is desired.

BACKGROUND OF THE INVENTION

The field of window shades has undergone constant change. Changes have varied from manually operated shades to shades that are operated by remote control and by other means.

In spite of these changes, the field typically does not draw from unrelated fields that may have application in the window shade field. One such unrelated field is that of torque sensing. Although the diverse field of torque sensing has existed for some time, it has not been applied to the window shade field, at least until the issuance of U.S. Pat. No. 6,116,320, the entire contents of which is hereby incorporated herein by reference. That application relates to window shade operation that moves a shade usually up and down between top and bottom or open and closed positions. It also discloses aspects that can be applied generally to window shade applications and in other applications as well.

One basic way to open or close a window shade is to manually pull or release a lift cord that draws the shade up or down to a desired position while engaging a locking mechanism to prevent the shade from falling down. This manual lift system has been used for decades with lift cord applications until motorized window shade systems were introduced into the market. The introduction of motorization led to the need to develop newer types of lift systems that would allow for motor control or a mechanical clutch.

Motorized control systems are used frequently to advance objects between one or more positions. In addition, such control systems are important to control or cut off movement of a moving object upon reaching a selected position or upon sensing an obstruction so that the object is not damaged after the position or obstruction is reached. This problem is typified by the operation of window shades, where the shade is normally intended to advance between upper and lower, or open and closed, positions but often may encounter unexpected interference or obstructions in its path of travel. Unless the movement is timely stopped, damage may occur to one or more of the shade, drive system, and the power source.

Different approaches have been taken to solving this problem, such as by counting the number of revolutions between the end limits of travel of the shade, using limit switches at opposite end limits, as well as by using magnetic and piezoelectric motion sensors. Newer aspects of the prior art may involve a form of position monitoring, for example, using slotted disks with an optical circuit that counts pulses. In some existing approaches, although the top and bottom positions may be set using the position monitoring method, over time, progressive error builds up in the number of pulse counts related to position. This may occur, for example, due to rounding error, such that each time the shade is opened or closed, a small difference is perpetuated between the actual position of the moving rail and the position understood by the control. Consequently, over time, the shut-off position changes from the desired position, requiring continuous adjustment by the operator.

Other systems have a mechanical adjustment in the system to set the upper and lower limits. The endpoints have a mechanical limit switch to shut off the motor or a locking mechanism that uses electronic means to shut off the motor by current sensing characteristics. The problem with these options in recognizing endpoints is that there is a limit of the number of output rotations from the motor, which limits the size of the shade.

Another problem with the prior art is the inability to recognize obstructions in the shade's motion. If the moving rail runs into an obstruction on the way up, current sensing electronics may stop the motor before the cord breaks or the motor is in lock rotor. On the way down, however, the shade will continue to unwind the lift cords even if the moving rail is not moving.

Some aspects of the prior art use speed sensing to control motor operation. However, problems persist in those systems. For example, some of those systems require a constant tension in lift cords, thus limiting the use of those systems in many applications. In addition, speed sensing systems are limited in their utility in particular types of movement, for example, they have limited utility in controlling or shutting off movement during the downward movement of a member, or when the member has reached its full limit of downward travel.

In addition, although some control systems for motorized shades may include control by operation of handheld remote control transmitter or by wall switch, none of the prior art provides a system for operation of a motorized shade in the absence of the remote control or wall switch, for example, by touching the shade to operate it.

None of the prior art approaches solves these problems by sensing the change in torque of the drive system generated in correlation with the travel of the shade. Thus, there remains a need for a system for determining the shut-off point in a shade, such that any deviation from the desired shut-off point is minimized or reduced. There also remains a need for a system to operate a motorized shade by touch control.

SUMMARY OF THE INVENTION

The present Invention comprises a novel and improved system for effecting and controlling the movement of a member between different positions, by way of example only, for opening and closing window shades. The present Invention comprises a novel lift system for window shades and any other application where movement of a member is desired. In particular, and without limitation, the Invention comprises a novel method to recognize and respond to obstructions in lift cord applications for motorizing lift products, as well as to provide touch control of the lift system.

In one preferred embodiment, the present Invention accomplishes shade movement by using an automated electrical device in concert with a spring-assisted motor. Thus, the operator can lift or touch the bottom of a moving rail but without lifting the entire weight of the shade due to the counterbalance in the spring mechanism. The movement imparted by the operator to the shade is sensed by the spring mechanism and a sequel is sent to the motor controller, causing the motor to engage which lifts the shade by its own operation, as well as in conjunction with a spring-loaded device that counterbalances the shade.

The present invention comprises mechanical and electrical components that, by way of example only, may fit inside the head rail of a shade and recognize an obstruction during the shade's upward and downward path of travel.

The invention also comprises a novel system to manually activate the shade. The touch control switch mechanism of the Invention itself includes an electronic mechanism to turn on and off, or raise a shade, by touch or pulling on it. Rather than wiring a wall switch or having a button on the head rail, the Invention allows the user to manually manipulate the moving rail, for example, by tugging, to operate the shade. This feature alleviates wiring difficulties for switch controls or for reaching head rail buttons on high shade locations, and operating difficulties caused by the absence of a handheld remote control. The Invention cures the problem by allowing the operator to pull or lift on the moving rail, which activates the shade to stop or to move in the opposite direction as it previously used. The Invention is particularly useful in situations where the end user needs privacy by closing the shade, the head rail is in a high difficult-to-reach location, and the remote control transmitter cannot be found.

BRIEF DESCRIPTION OF THE DRAWINGS

The features and inventive aspects of the present Invention will become more apparent upon reading the following detailed description, claims and drawings, of which the following is a brief description:

DETAILED DESCRIPTION OF THE PREFERRED EMBODIMENTS

In one preferred embodiment, the present Invention comprises a novel and improved sliding shaft drive system, torque sensing and control system, and touch control switch system for effecting and controlling movement of a member, by way of example only, a window shade.

In one preferred embodiment (FIG. 1), the Invention is comprised of a window shade 1 connected to a moving rail 2 and a head rail 3. Without limitation, the shade 1 of the Invention may comprise a cellular shade, a pleated shade, a lift and tilt shade, or a horizontal blind.

Figure 2:
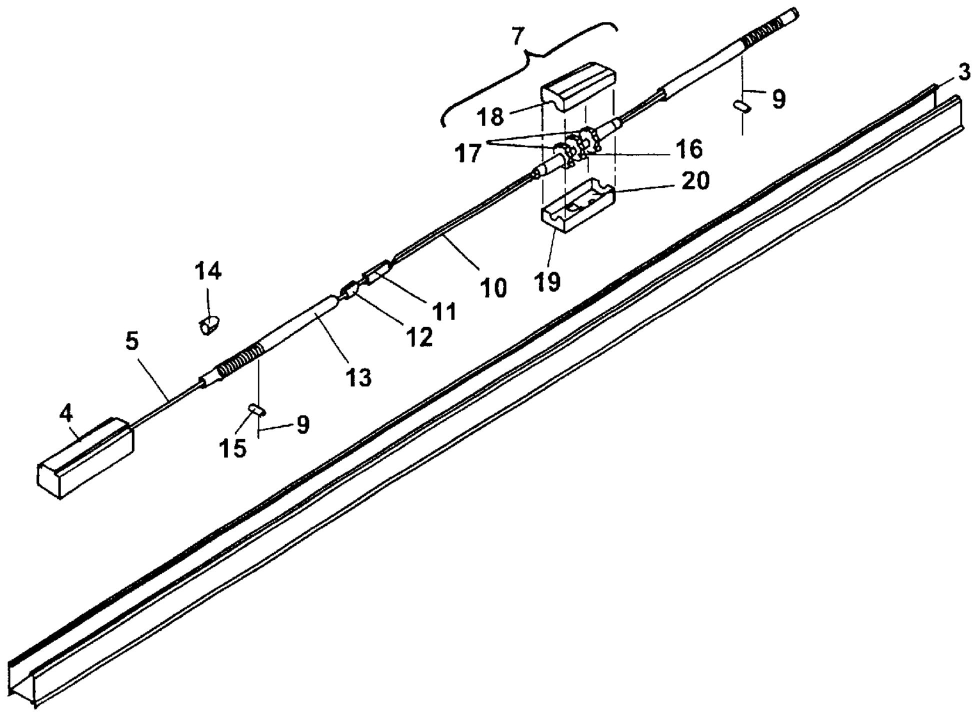
FIG. 2 is an exploded view of the sliding shaft lift system and the torque sensing and control mechanism, without touch control, shade, or moving rail.

The head rail 3 contains a drive motor 4 engaged with a drive shaft 5. The drive shaft 5 passes freely through a hollow hex-shaft 10. (FIG. 2). The drive shaft also passes through a sliding shaft 13 (FIG. 3), which is concentric. The motor output passes through the hollow hex-shaft 10, with no physical engagement.

Figure 3:
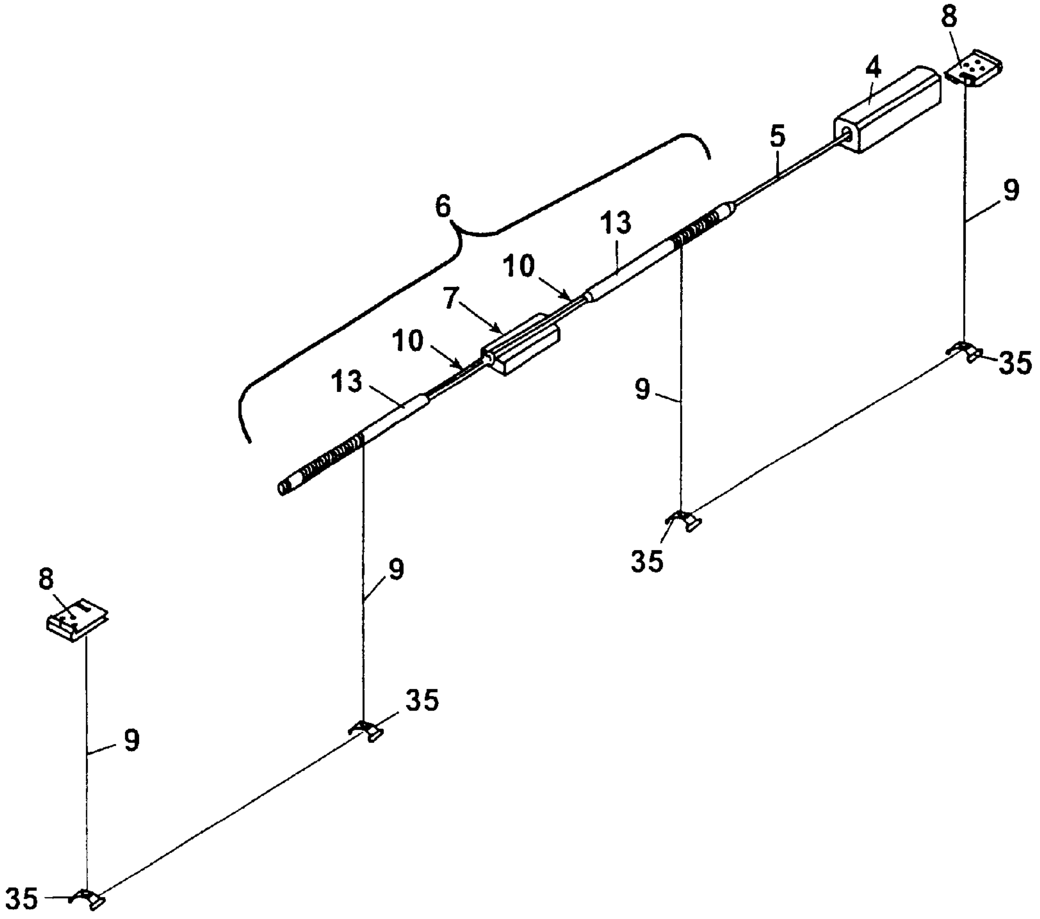
FIG. 3 is a diagram of the motorized shade lift system with the touch control switch mechanism (fabric, head rail or moving rail except for guides not shown).

In one embodiment (FIG. 3), one or more lift cords 9 is attached to one or more touch control switch mechanisms 8 in the head rail 3, then routed through the shade fabric and the moving rail (not shown in FIG. 3), and engaged at the other end to the sliding shaft mechanism 6. In one embodiment, the moving rail 2 may comprise one or more guides 35 attaching to it which route the cord 9 through the moving rail 2. The sliding shaft mechanism 6 is comprised of one or more rotatable hollow hex shafts 10 and sliding shafts 13 into which the drive shaft 5 passes freely, allowing both linear and rotational motion between the two shafts (FIG. 3).

Figure 4:
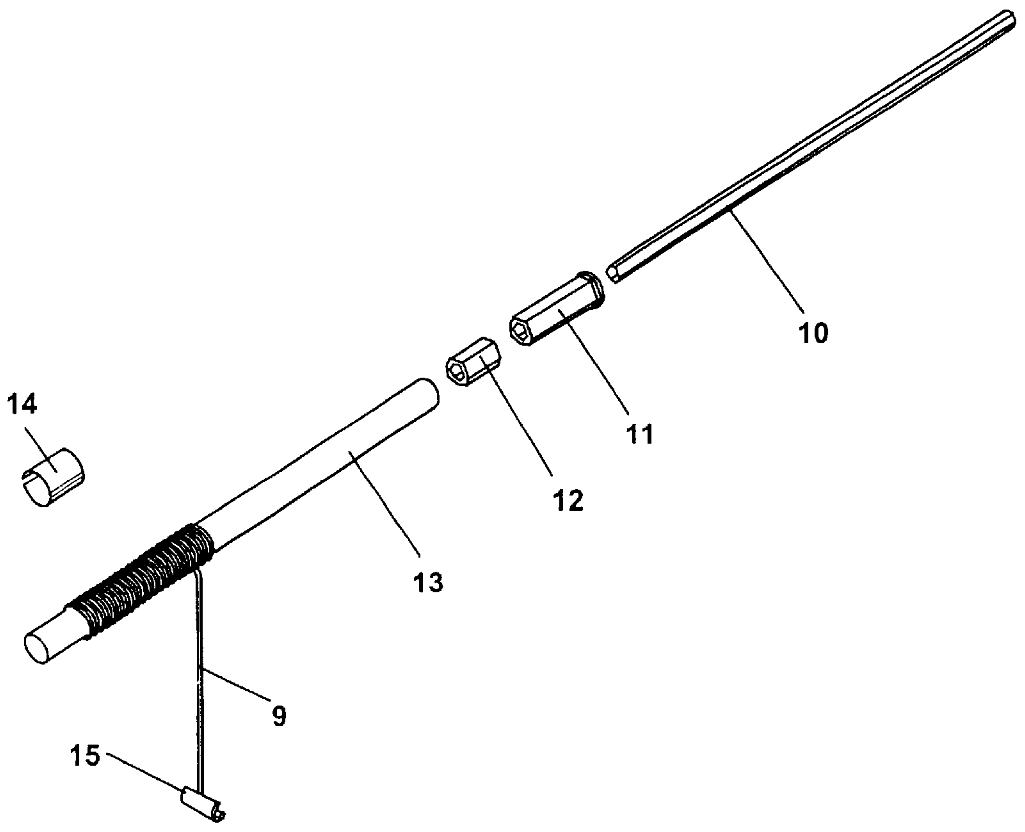
FIG. 4 is a exploded view showing the sliding shaft lift system.

As shown in FIG. 4, in a preferred embodiment, one end of the hollow hex shaft 10 is fitted through an insert 11, and a stopper 12 is press-fit over the end of the hollow hex shaft 10. The insert 11 fits into a sliding shaft 13 to serve as a sliding bearing surface for the hollow hex shaft 10 at one end. The stopper 12 on hollow hex shaft 10 slips into the sliding shaft 13 and acts as a sliding bearing surface internally against the inside of the sliding shaft 13 at the other end. The bearing surface of the sliding shaft 13 may slide back and forth, but does not rotate independently from the hollow hex-shaft 10. One or more ribs in the extrusion of the sliding shaft 13 engage mutually with the stopper 12, such that there may be lateral motion, but with no appreciable difference in rotational movement. The stopper 12 press-fit on the end of the hollow hex-shaft 10 prevents the sliding shaft 13 from coming off when disassembled. It also defines the limit of travel in one or more directions. When fully extended, the stopper 12 in the hollow hex-shaft 10 contacts the insert. The outer shape of the stopper 12 and inside shape of the sliding shaft 13 mutually engage along one or more internal ribs within the sliding shaft that prevent independent rotation of the sliding shaft 13 and the hollow hex shaft 10 while allowing smooth linear motion between the two shafts.

The lift cord 9 wraps around the sliding shaft 13 in a helix and is secured at one end to the sliding shaft 13 with the clip 14. (FIG. 4). The sliding shaft 13 is supported on one or more cradles 15 that serve as a smooth bearing surface for both linear and rotational motion of the sliding shaft 13. The lift cord 9 is attached to the sliding shaft 13 at the top and is attached to or threaded through a moving bottom rail 2 at the bottom. When the motor is operated, rotational motion occurs, and the lift cord 9 wrapping the sliding shaft 13 is wound and unwound in such a way to move the shade 1, by way of example only, by raising or lowering it.

Figure 15:
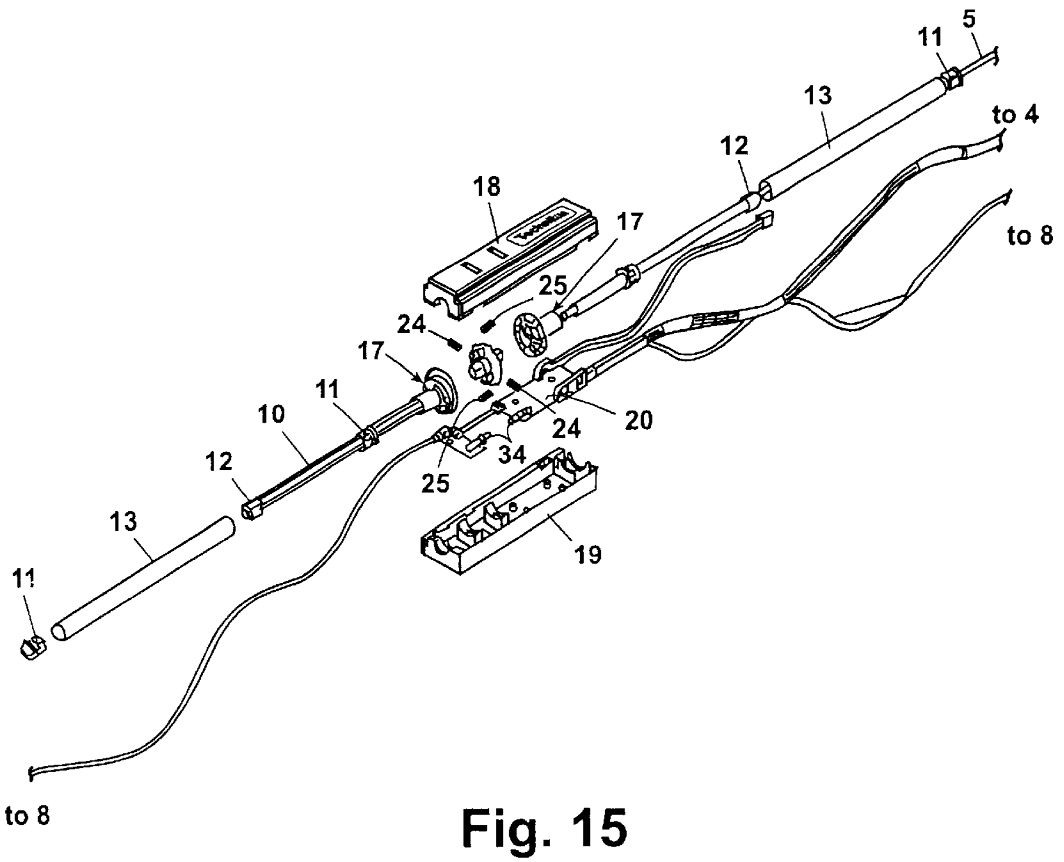
FIG. 15 is an exploded view of the sliding shaft system and the torque control system also showing certain electronic components of the Invention.
Figure 17:
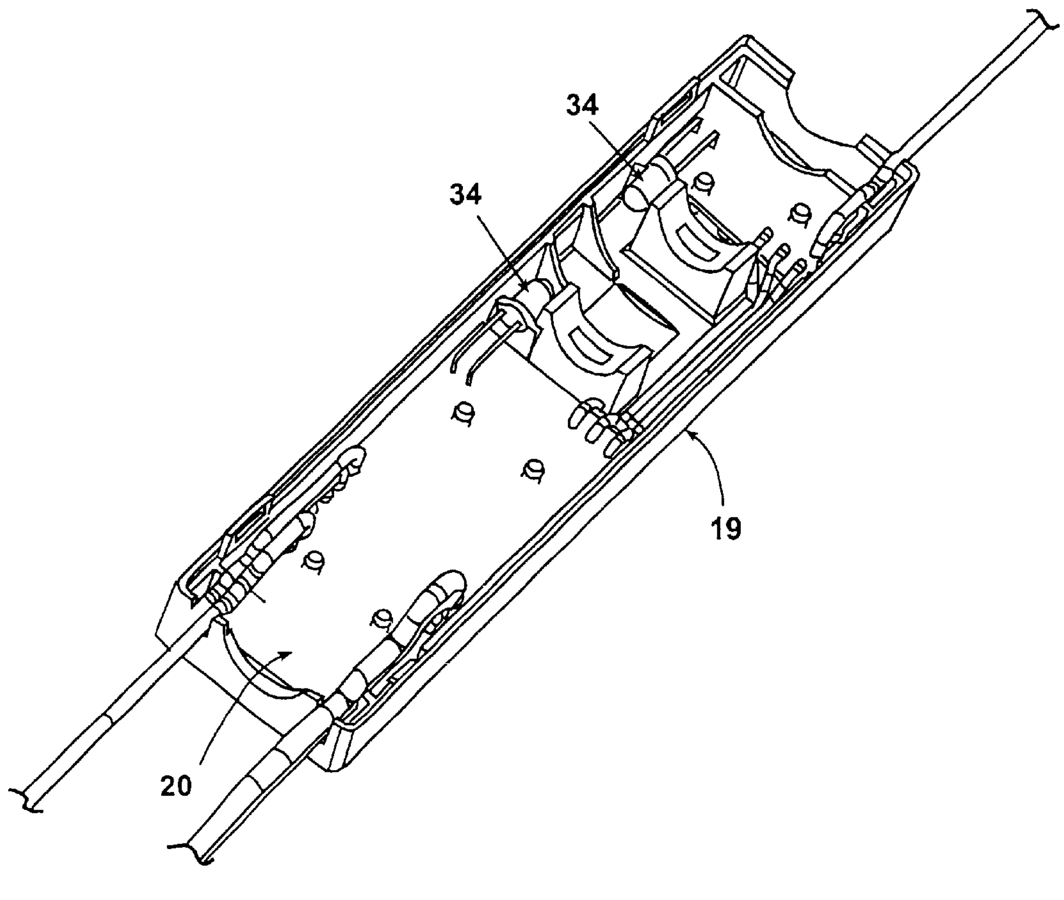
FIG. 17 is an exploded view of one embodiment of the optical pair of the Invention.
Figure 18:
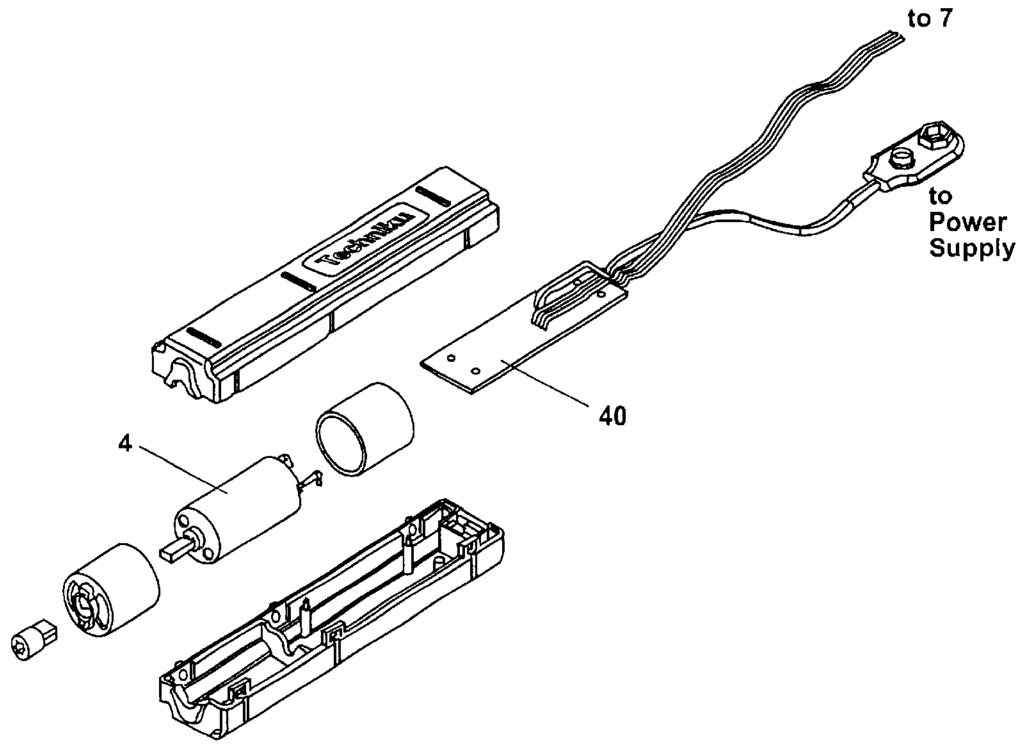
FIG. 18 is an exploded view of one embodiment of the Invention's motor with associated parts and circuitry.

Another end of the one or more hollow hex shafts 10 attaches to the torque sensing and control mechanism 7 (FIGS. 5, 6, and 7)). The torque sensing and control mechanism 7 contains one or more MD' drivers 16 (FIG. 6) connected to one or more, preferably two, of MD' driven parts 17 through one or more springs (as described in U.S. Pat. No. 6,116,320) to allow for a small relative rotation between the driver 16 and driven parts 17. The MD' driver 16 and driven parts 17 are contained within an MD' top case 18 and MD' bottom case 19 (FIG. 7) to allow for the rotating optical slots in the MD' to interact with the MD' electronics 20 (FIGS. 2, 15, and 17).

Figure 6:
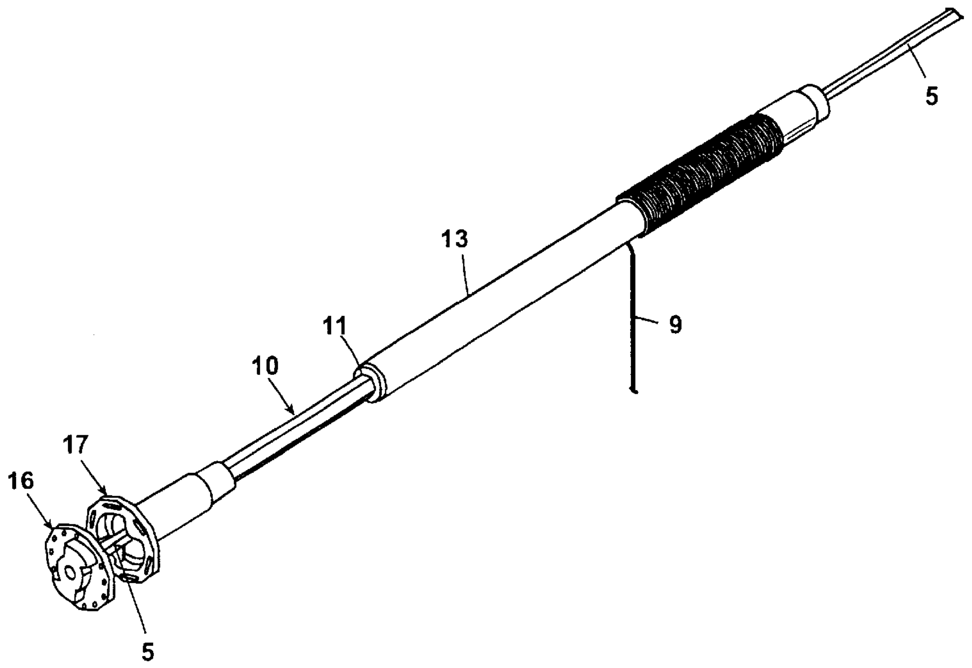
FIG. 6 is a close-up view showing attachment of the sliding shaft system to the torque sensing and control mechanism.

In a preferred embodiment, the hollow hex shaft 10 is connected at its other end to one or more MD' Driven parts 17 in the torque sensing and control mechanism 7. (FIGS. 2 and 6). The shaft coming out from the sliding shaft 13 is the hollow hex-shaft 10, and the shaft that connects to the center driver disk 16 of the driver mechanism 7 is the drive shaft 5. Thus, any rotational torque empowered by the motor through the drive shaft 5 engages the driver part 16 of the driver mechanism 7. When the driver is connected to the driven part 17 of the driving mechanism 7 through one or more compression springs, a pre-loading occurs, and rotation occurs through the driven members as disclosed in U.S. Pat. No. 6,116,320.

In one preferred embodiment, the system functions in the following way when the shade 1 is fully opened and the motor 4 is turned on to close the shade. The drive shaft 5 engaged with the motor 4 rotates in the proper rotational direction to lower the shade 1. The drive shaft 5 engages the MD' driver 16 and imparts this rotation through the MD' driver 16 into the MD' driven parts 17 by way of one or more compression springs (e.g., 24, 25 in FIGS. 15, 19 or 20) that connect them. The MD' driven parts 17 engage the hollow hex shaft 10 which in turn engages the sliding shaft 13 with the same rotation. The lift cord 9 that is wrapped around the sliding shaft 13 unwinds to allow the moving rail 2 of the shade 1 to lower. As the shade 1 is lowered, the cords 9 unwind on the sliding shaft 13, which slides freely toward the center of the shade 1 so that the unwrapped cord stays aligned with the cradle 15. When the moving rail 2 reaches the lowest level at the bottom, the torque imparted through the lift cord 9 on the sliding shaft 13 drops almost to zero when the cord 9 hangs directly below the centerline of the shaft 13. This change in torque is detected and translated from the sliding shaft 13 through the hollow hex shaft 10 into the MD' device 7 thereby releasing a preloaded condition through the springs that connect to MD' Driver 16. This rotational difference opens up a series of slots that allow a light beam to pass through a photomodule device 34 in the electrical circuit 20 (FIG. 17) to signal a shut-off condition for the motor 4.

The system functions in the following way when the shade 1 is raised to a fully opened condition. The shaft of the motor 4, which may be bi-directional, turns the drive shaft 5 in the opposite direction. The drive shaft 5 engages the MD' driver 16, which rotationally compresses the springs that attach to the MD' driven parts 17. This condition closes the light gap in the optical circuit 20, 34. The MD' driven parts 17 rotate the hollow hex shaft 10, which in turn rotates the sliding shaft 13. The force created from the helical cord wraps around the sliding shaft 13, thereby causing the sliding shaft 13 to slide toward the outer end of the shade. When the shade 1 reaches the fully open position, the higher torque condition is created that is translated through the sliding shaft 13 to the hollow hex shaft 10 to the MD' driven parts 17. This increased torque causes a greater compression of the springs that engage the MD' driver 16 to open the optical slots which signal the motor to shut off.

In the present Invention, the sliding shaft 13 is rotated in conjunction with the hex-driver 10, so that it turns and pulls the lifting cord 9. The sliding shaft 13 rotates, but is free to move laterally, such that it may slide along the hollow shaft and allow take-up from a relatively constant point. Some free play is permitted between the drive shaft 5 and hollow hex-shaft 10 to permit a slight rotational difference to accommodate a free loading or unloading of the driven 17 and driver 16 members. This facilitates the loading of the compression springs in the Invention.

In a preferred embodiment, the Invention provides several advantages over the prior art. By way of example only, the lift and control system of the Invention can be pre-assembled prior to the shade fabrication process so that a fabricator can simply drop it into the shade head rail. This can be performed on a new shade during the initial fabrication, or as a retrofit on existing shades. Moreover, with the Invention's block and tackle cording system, route holes for the lift cord 9 can be located close to the ends of the shade 9 and not interfere with the motor 4. This is a major advantage over existing motor systems that lift from one end and require a wider route hole distance from the end.

In one preferred embodiment, the sliding shaft system is positioned between the wrapping lift cord mechanisms (FIG. 8), and the sliding shaft system is comprised of two separate sliding shaft systems with one MD driver 16 input engaged with the motor 4. The driver 16 is placed between the lift mechanisms and drives outward to both of the sliding shaft systems. Driving both directions separates two separate sliding shafts 13 to lift the lift cords 9.

In one embodiment, the sliding shaft system of the Invention may have a take-up diameter that is relatively small and constant throughout the full range of the lifting mechanics. This constant, small diameter allows for extra rotational angles in order to activate the Invention and reduce the distance of shade movement in the system without any noticeable shift. In addition, the sliding shaft system has relatively little system friction. This allows for predictable linear torque differentials that work smoothly with the Invention's spring mechanics.

Figure 1:
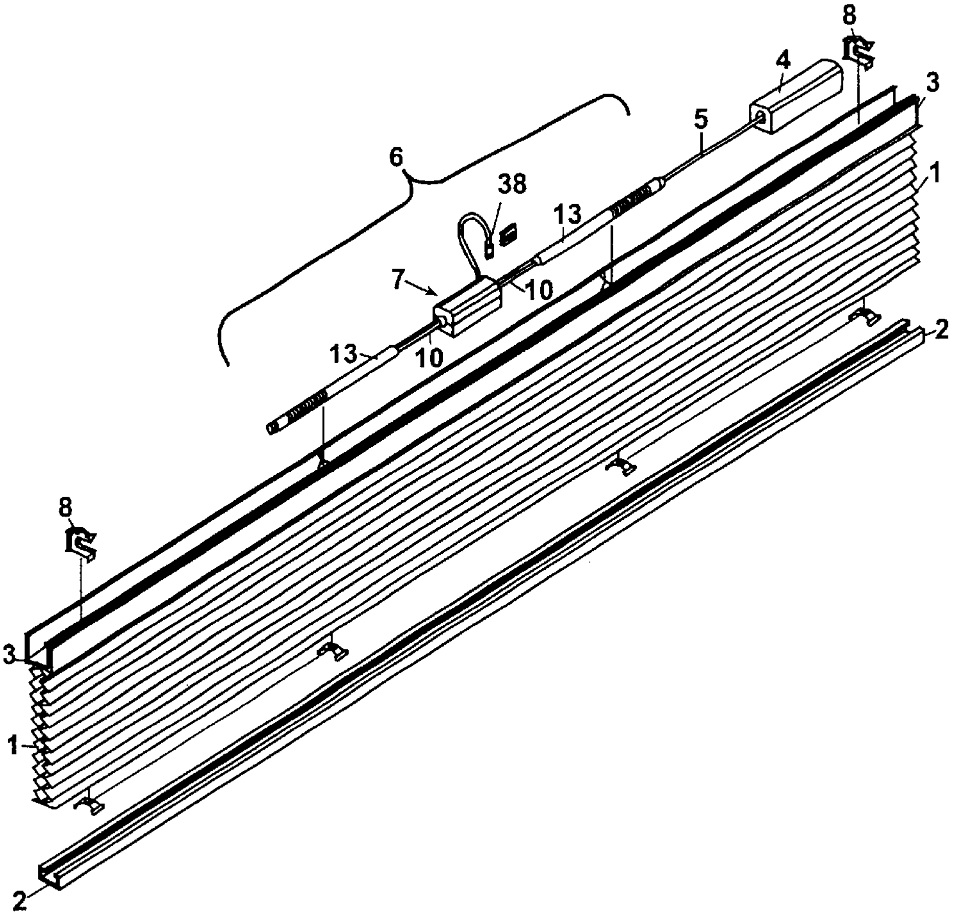
FIG. 1 is a exploded view of a preferred embodiment of the Invention comprising a motorized cellular lift system with sliding shaft system, torque sensing and control system, and touch control switch mechanism.
Figure 9:
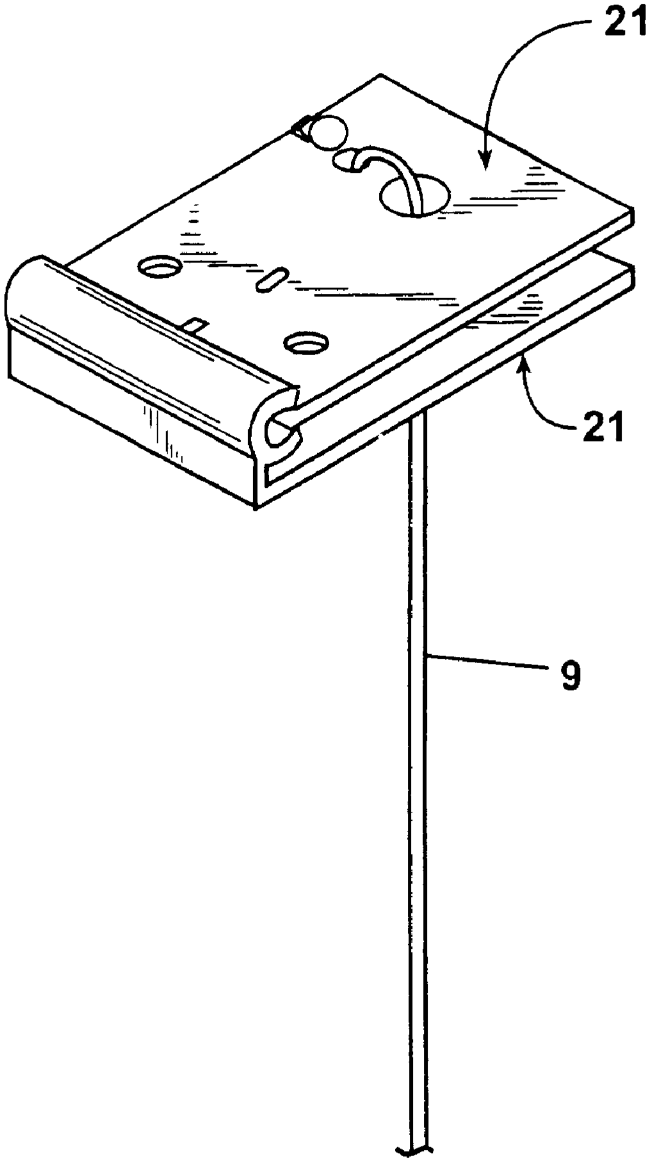
FIG. 9 is a close-up view of one embodiment of a touch control switch mechanism.

In the embodiment of FIG. 1, the Invention also comprises one or more touch control switch mechanisms 8. However, without limitation, the touch control switch system of the Invention may be used in any embodiment that allows for the actuation of a motor in any system where movement of a member is desired, and thus may be adapted in any type of lift or motorization system. In one preferred embodiment, the touch control switch mechanism (see FIGS. 9 and 10) may allow for the actuation of the motor 4 without requiring a connection to the torque sensing and control or sliding shaft systems.

Figure 8:
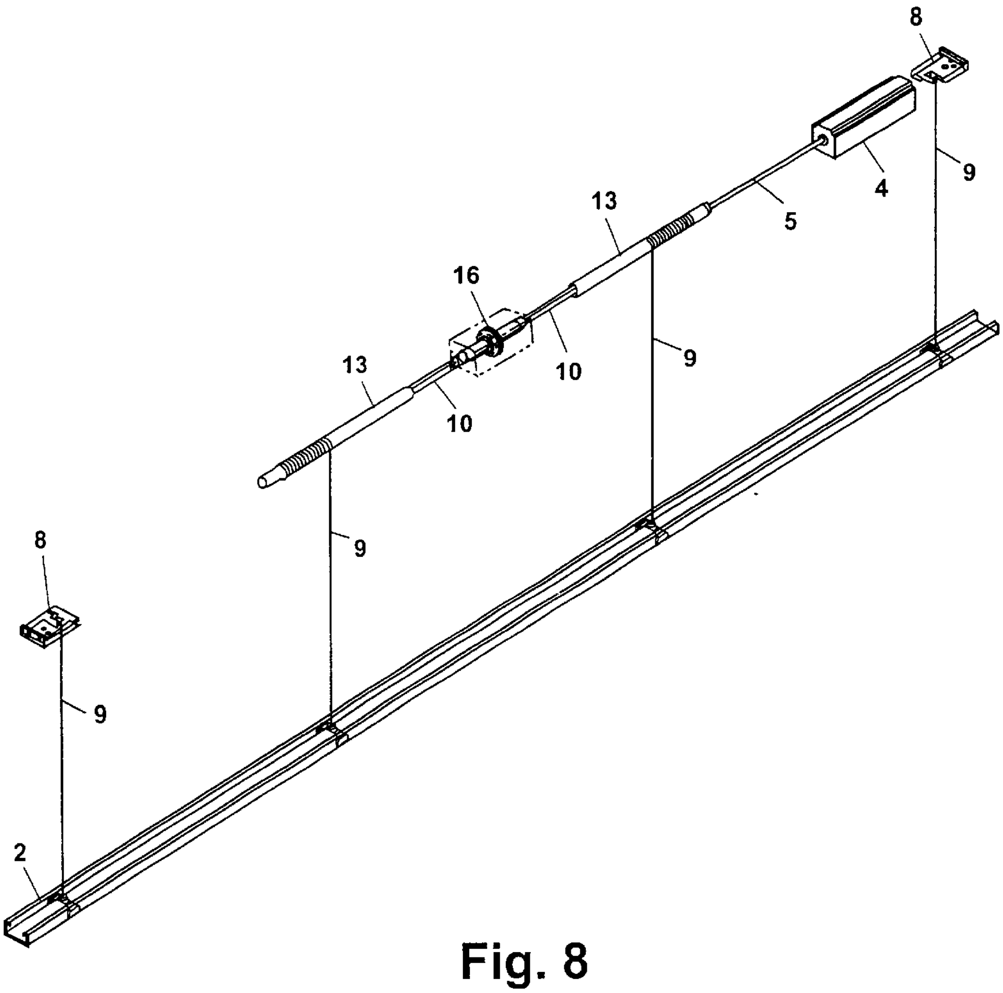
FIG. 8 is a diagram of a motorized shade lift system with a torque sensing and control mechanism and touch control switch mechanism and showing no fabric or head rail.
Figure 16:
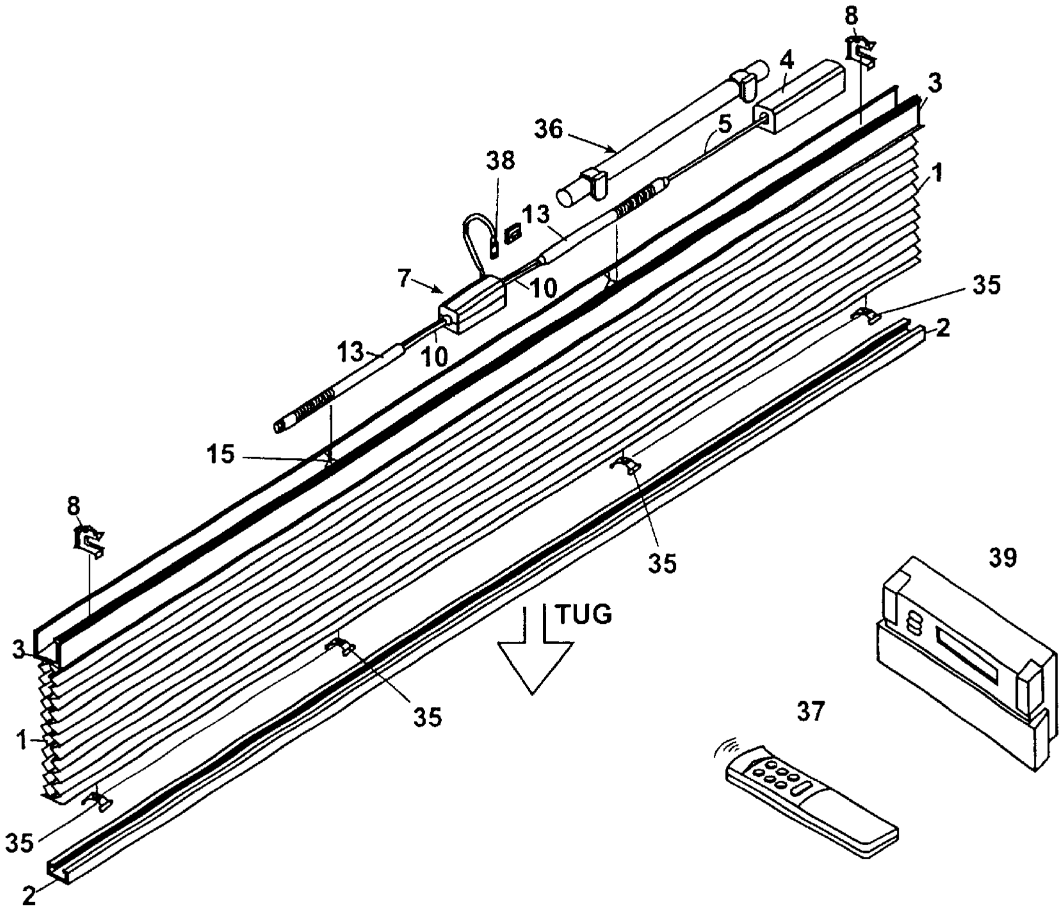
FIG. 16 is an exploded view of one embodiment of the Invention showing a battery pack, signal receiver, remote control transmitter, and timer.

As applied in the field of window shades, and without limitation, in one preferred embodiment of the Invention, a user may disturb (i.e. either lift or pull) on the moving rail 2 of a window shade in order to actuate a motor 4 to lift or lower the shade 1 (e.g. FIG. 16). This actuation is accomplished through the use of one or more touch control switch mechanisms 8, for example, located at opposite ends in the head rail 3. The touch control switch mechanism may be comprised of opposed surfaces 21 that are pivotally connected, as shown in the embodiment in FIG. 9. The lift cord 9 is connected to the switch mechanism at one end. Alternatively, in other embodiments, the end of the lift cord may be attached to any mechanism known to one of ordinary skill in the art for taking up slack in such cords. The lift cord 9 is routed through the touch control switch mechanism such that differential changes in tension of the cord 9 will cause changes in the relative position of the opposed surfaces 21. In one embodiment, the lift cord 9 is also routed through the fabric 1, moving rail 2, back through the fabric 1, and then attached to the lift mechanism 6 at the other end (FIG. 8). The switch mechanism 8 is electrically connected to a control circuit 20 to actuate the motor 4.

Figure 10A:
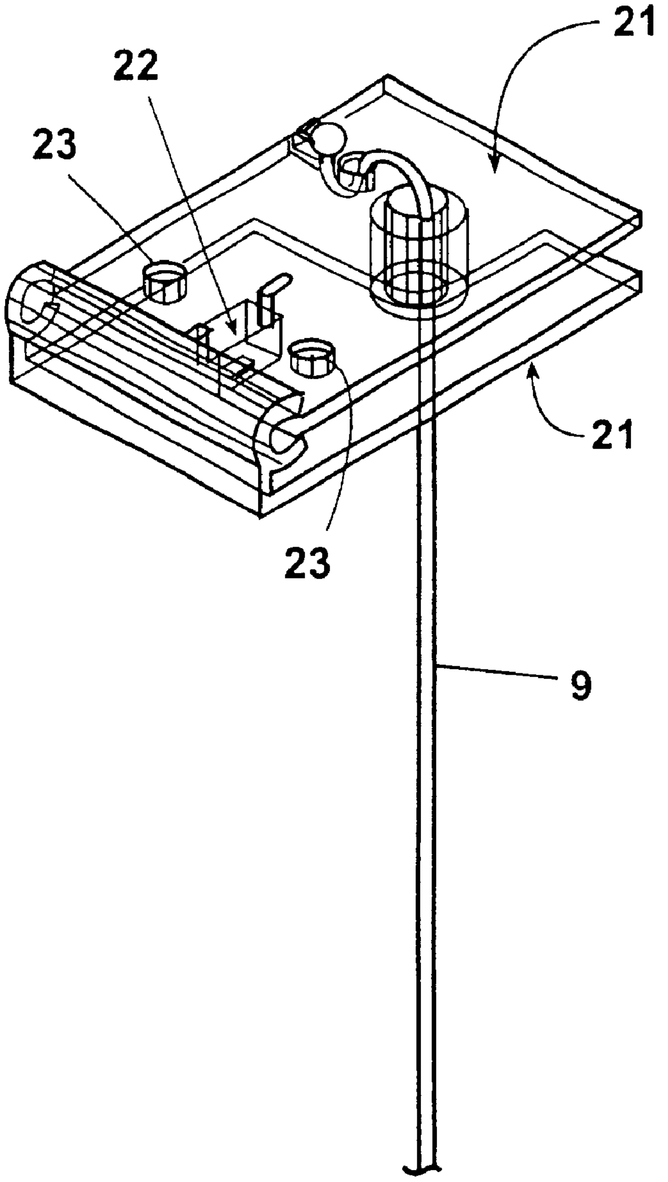
FIG. 10A is a close-up view of one embodiment of a touch control switch mechanism.
Figure 10B:
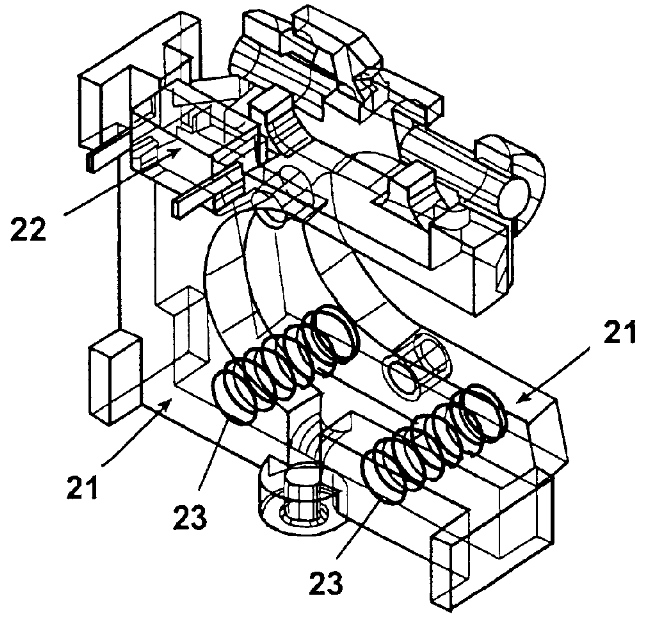
FIG. 10B is a transparent view of one embodiment of a touch control switch mechanism.
Figure 10C:
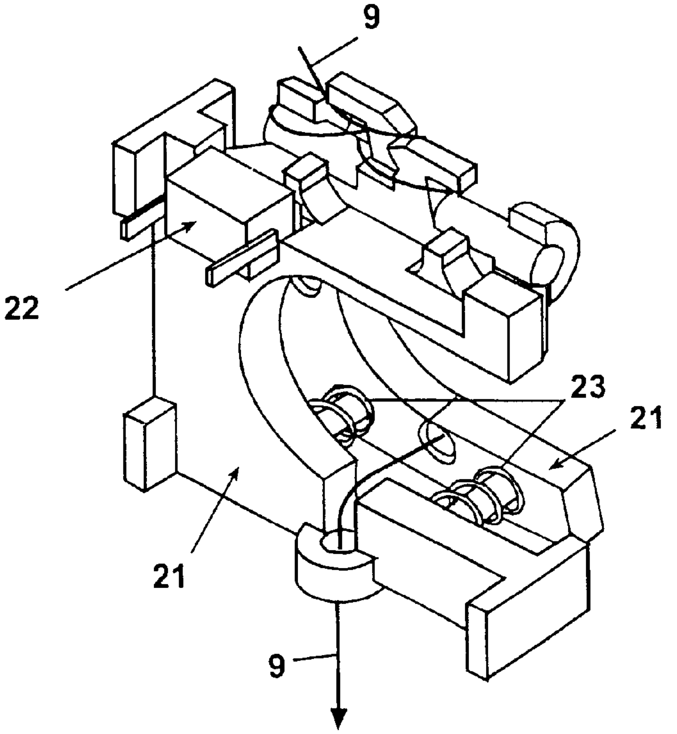
FIG. 10C is an angled side view of one embodiment of a touch control switch mechanism.
Figure 10D:
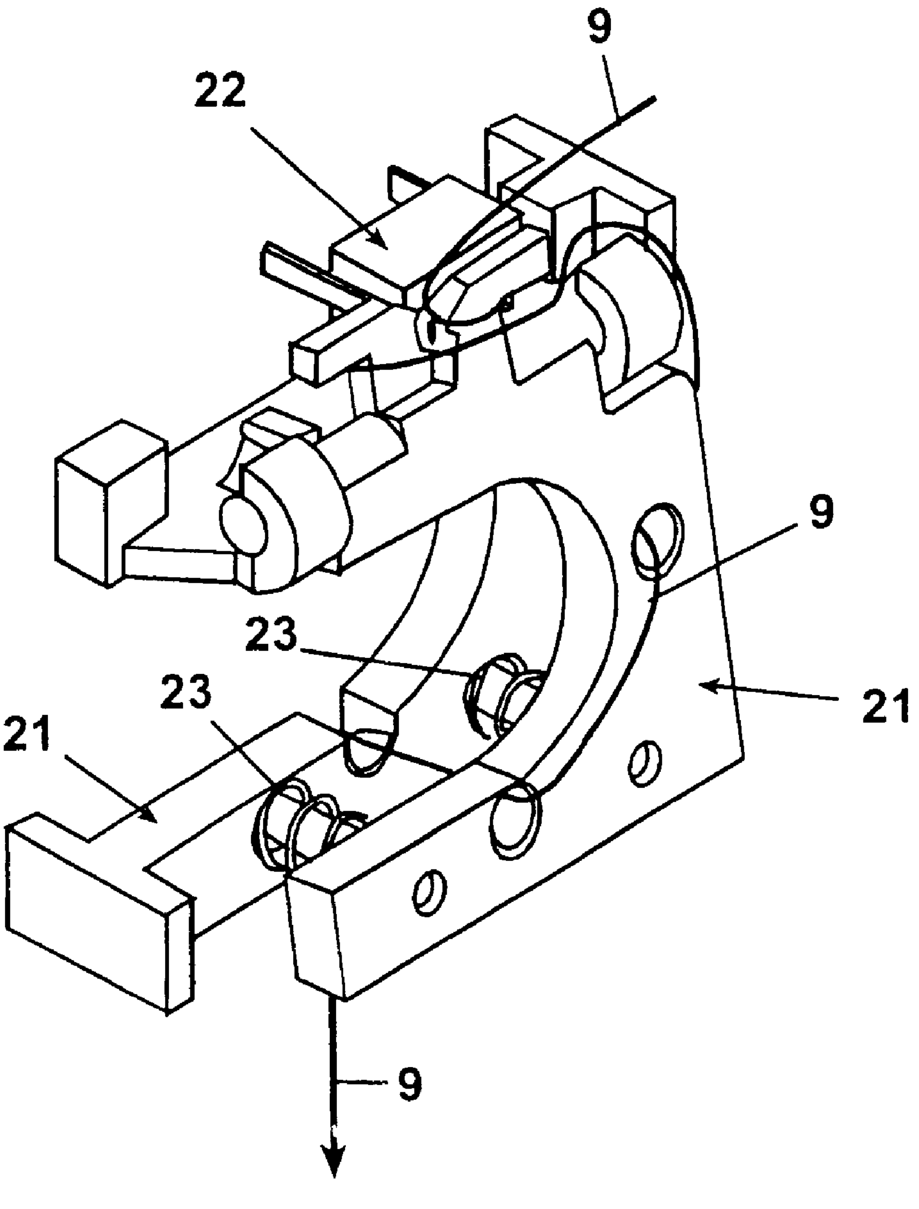
FIG. 10D is an opposite angled side view of one embodiment of a touch control switch mechanism.

As shown in FIG. 10A, in one embodiment, the touch control switch mechanism of the Invention may comprise one electrical switch 22 and one or more springs 23 to detect the change in force translated through the lift cord 9. Moreover, the Invention comprises a method of mechanical switching that is a passive power-consuming element, such that power is not consumed until the switch is activated. This passive rather than active feature power requirement is more efficient and better suited to battery-powered systems. In addition, in one preferred embodiment, the shade can be activated anywhere between the fully open or fully closed position.

As shown in FIG. 10A, in a first embodiment, the touch control system is comprised of two elements 21 with one or more round circular slots on the switch incorporating a spring 23. The strength of the spring is stronger than the total torque rotation of the driver device. In a second embodiment, electrical switch 22 is comprised of first and second switches, having internal biasing springs having springs constants K1 and K2 respectively (see FIG. 10E). One switch is effective for sensing lift and the other for sensing pull. In the second embodiment, switch #2 is not normally engaged. However, when a certain amount of force is applied, switch #2 closes, and it activates the motor and runs the motor in the direction opposite to its previous operation. Switch #1 operates in a normally open mode unless the load on member 21 is such that it assumes or exceeds position A. Because internal springs preferably have different spring contacts, they can be made to sense the different load conditions present at the top and the bottom of window shade travel. The logic for bi-directional operation of one preferred embodiment of the Invention is set out in detail in FIG. 12.

In another embodiment, the touch control provides a lift and tug feature, for example, in conjunction with a position monitoring system in combination with the driver mechanism. The driver mechanism in the spring may give a zero point for the position monitoring, counting pulses as the blind travels upwardly and locking up at the top. Thus, the operator may set the stop point below the complete upwardly lift to provide some operation, thereby triggering the touch control. The position monitor may also comprise preset stop points.

In one preferred embodiment of the Invention (FIGS. 10*b*, 10*c* and 10*d*), the touch control mechanism is comprised of two opposing elements 21 through which a lift cord 9 is threaded. The mechanism is further comprised of two springs 23 and an electronic switch 22, such that changes in tension of the lift cord may effect opening or closing of the switch 22.

By way of example only, in one preferred embodiment, the ends of the cords 9 that otherwise would attach to the touch control switch mechanism 8 are connected to the head rail 3 through a stationary connection, for example, by means of a knot in a retaining washer. In another embodiment of the Invention, the touch control switch mechanism 8 may be omitted or replaced by a switch mounted in the head rail.

In one embodiment, the present Invention is comprised of lifting shafts that are relatively short in comparison to the prior art. The lift mechanism of the Invention permits the lifting cords to be located close to the ends of the shade.

Thus, there is accommodation for the distance from the route hole of the cord to the end of the shade, for example, to impart stability to the shade during movement. In the prior art, many motors located in head rails are located at one end of the shade or the other, and the route hole distance becomes critical because the end of the lift cord must be located at the end of the shade, and the motor is mounted there. In contrast, in some embodiments of the present Invention, the cord ends are stationarily attached to the head rail or components therein and thus can be placed fully at the end of the shade if desired. The lifting cords thus drop down, encounter the moving rail, are routed towards the center of the shade, returned upwardly to the lifting mechanism, which itself can be centered in the shade. Consequently, the overall length of the entire lift system can be contained in a distance much shorter than the prior art, by way of example only, thirteen (13) inches or less between the lifting cradles. Thus, the present Invention permits the use of motorization systems in narrower shades than others found in the prior art.

The present Invention also addresses problems found in the prior art arising during the installation of shades. During installation of a typical manual shade, the installer attaches a cord in the bottom rail, for example, by means of a knot and a washer, then runs the cord through the shade fabric and wraps it around the rotating shaft. This process requires that the fabricator build the shade so that the bottom cord knots are all located in exactly the same position when the shade is fully extended.

In one embodiment, the Invention comprises means, for example, a sliding lock mechanism, that permits the user to adjust the length of only one cord at one location instead of having to adjust multiple cords at different locations. This configuration also means that the number of lift cradles can be reduced compared to a manual shade.

The present Invention also permits the motorization and control systems to be pre-assembled, installed in a head rail, with existing cradles, thus cutting down fabrication time by a substantial percentage.

The Invention may be comprised of power supplied by one or more chargeable or nonrechargeable batteries, low voltage power sources, solar power, or by an AC or DC power supply connected to the other elements of the Invention. In one embodiment, the battery power supply may be located in the head rail. In other embodiments, the battery power supply 36 may be mounted external to the head rail, by way of examples only, wall mounted or attached externally to head rail (FIG. 16).

Figure 11:
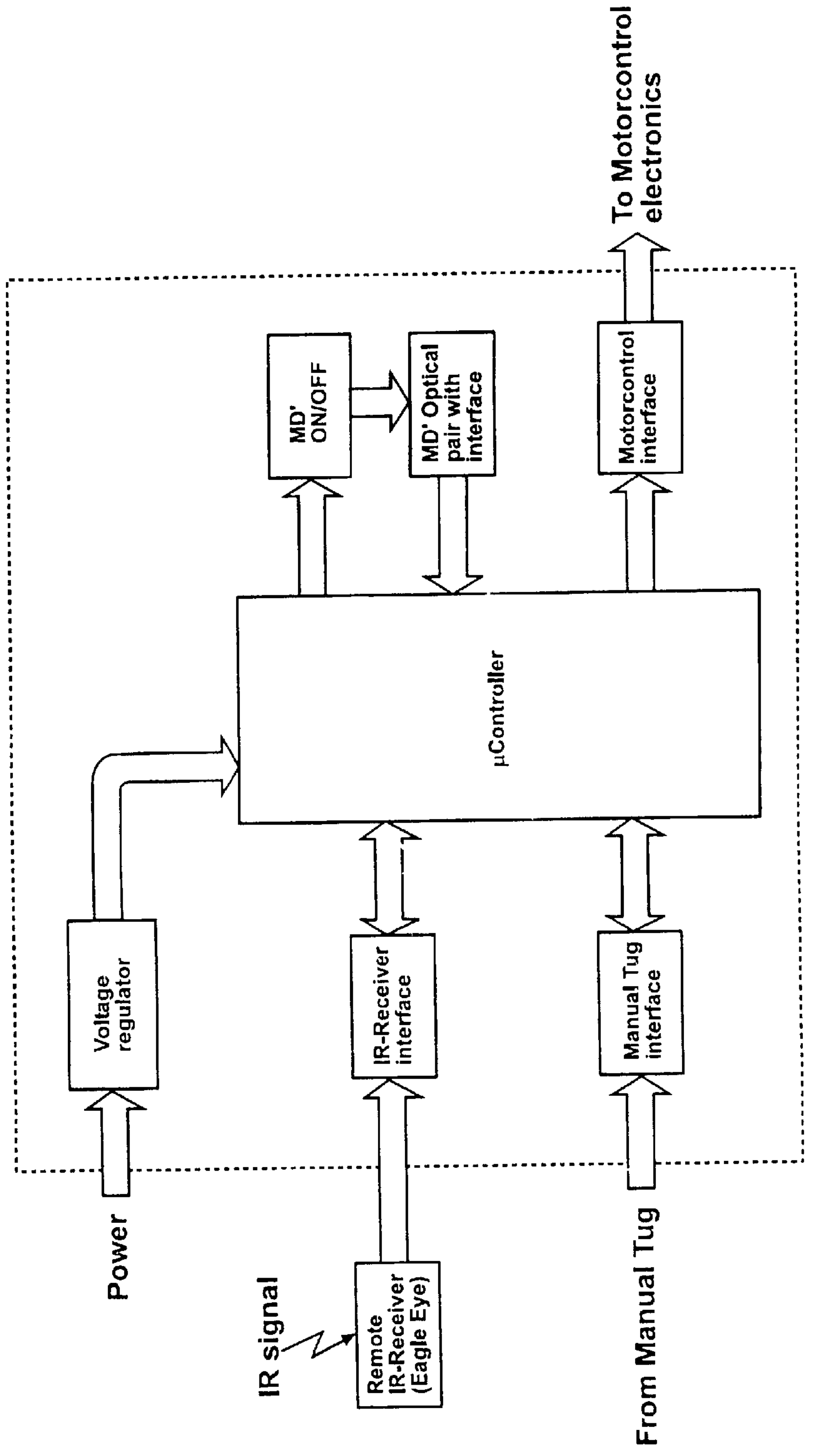
FIG. 11 is a block diagram of components in one embodiment of a control unit of the Invention.

In one preferred embodiment (FIG. 11), the Invention is comprised of at least one electronic control unit, itself comprised of: (1) a microcontroller with program and data memory (Rom and Ram); (2) a remote control transmitter 37 (FIG. 16); (3) a remote infrared-receiver circuit that detects infrared signals and demodulates them to digital signals; (4) an infrared-receiver interface circuit that interfaces the remote infrared-receiver with the microcontroller and also enables the possibility to switch the remote infrared-receiver (and infrared-receiver interface circuit) off; (5) an MD' ON/OFF circuit that switches the MD' optical pair and interface off and on; (6) an MD' optical pair with interface circuitry; (7) a motor control interface circuit that controls the motor control circuit; (8) a touch control system interface that interfaces with touch control functionality; and (9) a voltage regulator that stabilizes the voltage levels coming from a power supply for the control unit circuitry. One embodiment of the Invention may comprise a receiver 38 that can be mounted remotely to receive signals from a signaling device, such as a handheld remote control transmitter (FIG. 16). In one embodiment, the Invention may comprise a timing device 39 that may be used to control or effect movement of one or more moving members (FIG. 16).

Figure 12:
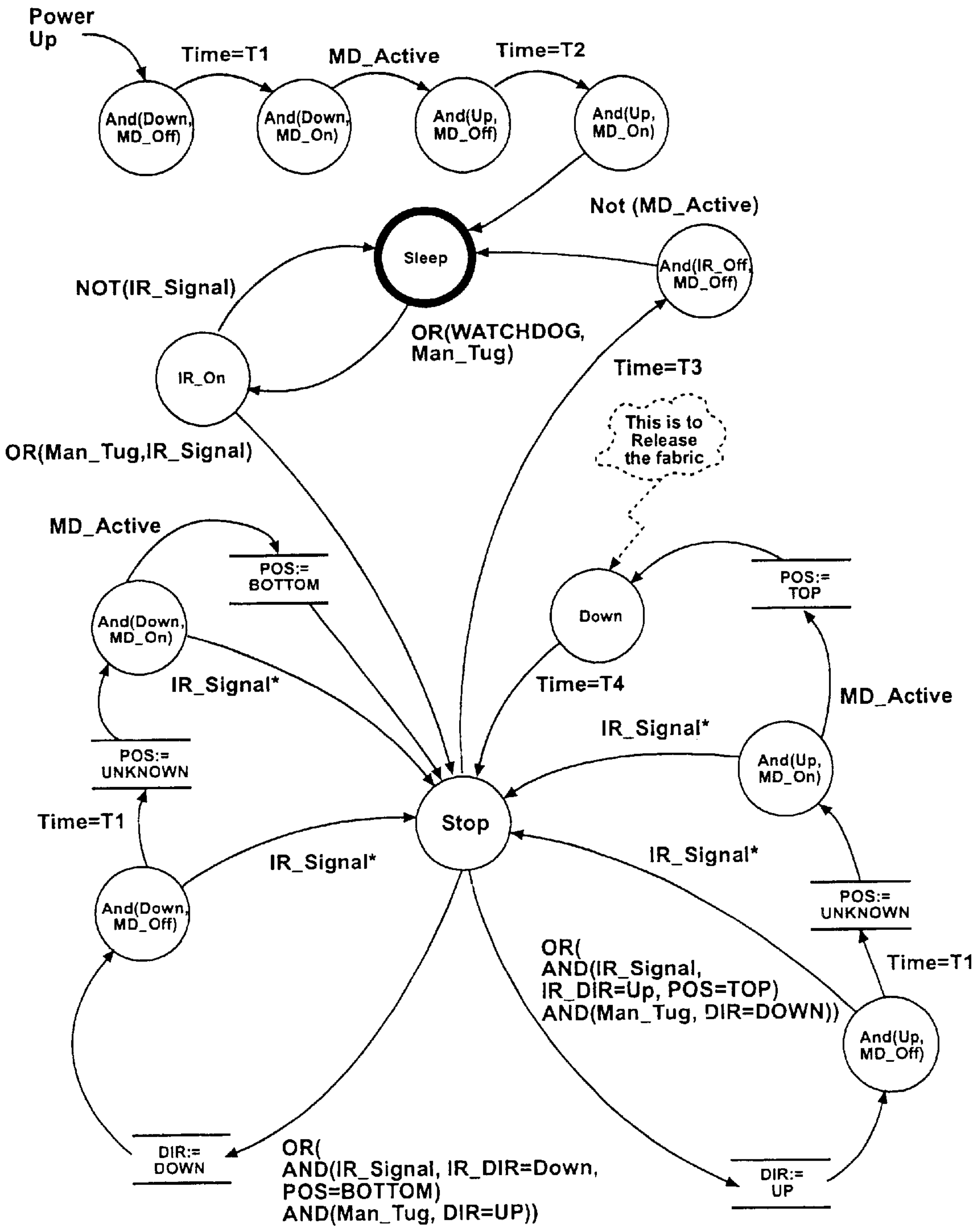
FIG. 12 is a software state diagram of one preferred embodiment of the Invention.
Figure 13:
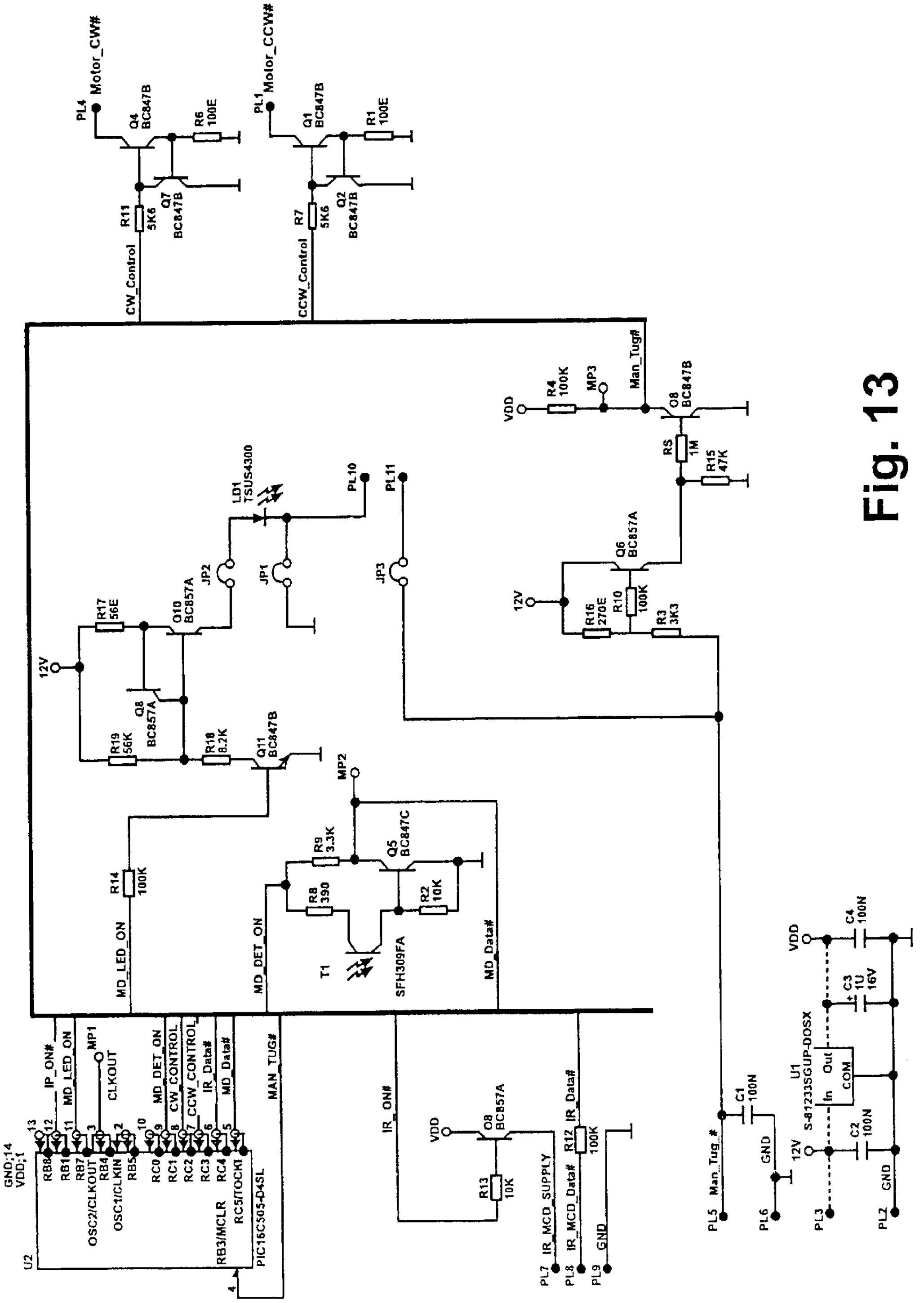
FIG. 13 is a schematic diagram of control unit circuitry in one preferred embodiment of the Invention.
Figure 14:
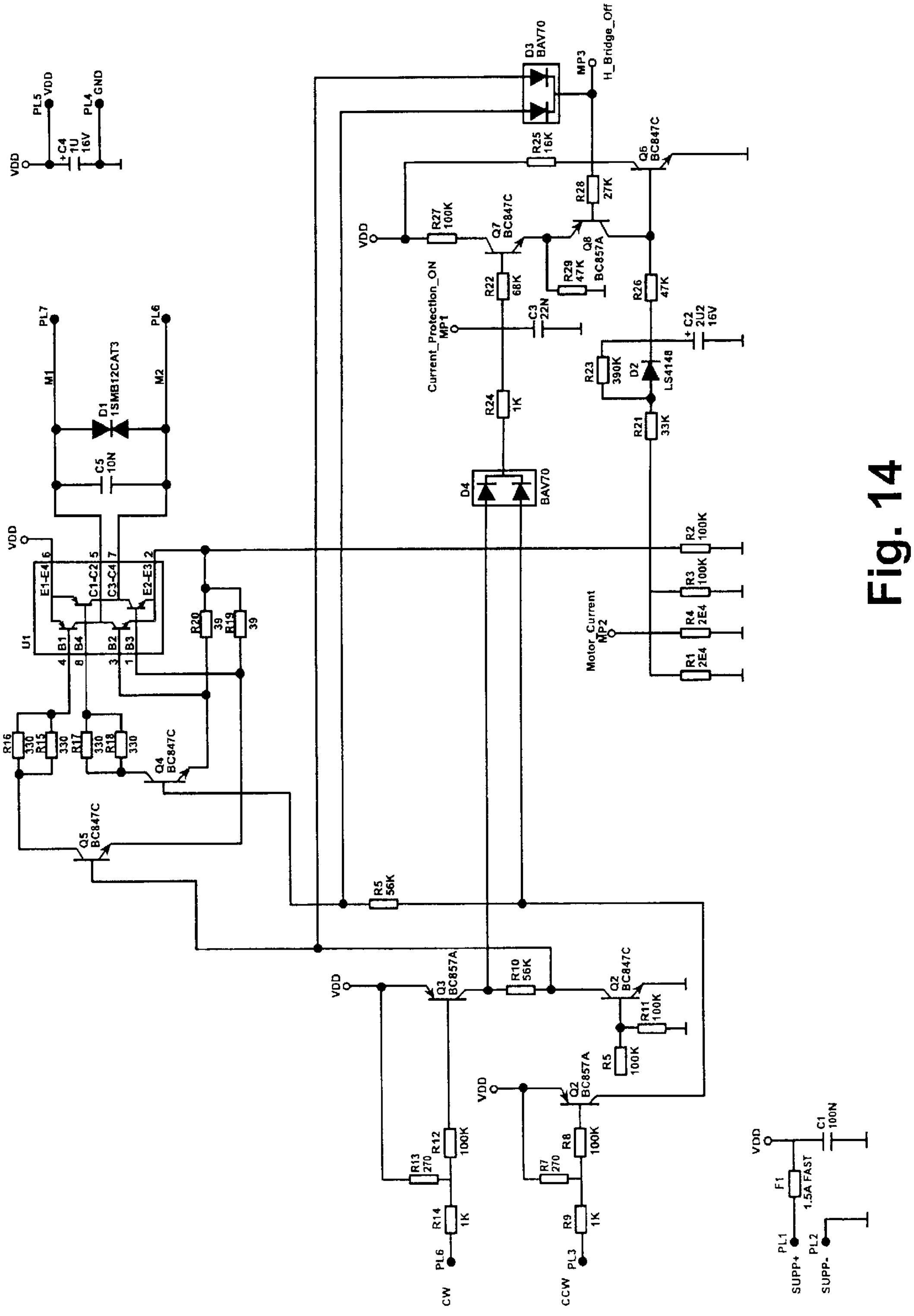
FIG. 14 is a schematic diagram of motor driver circuitry in one preferred embodiment of the Invention.

FIG. 12 shows one preferred embodiment of the Invention's software functionality. In this embodiment:

1. Each state (text surrounded by a circle) shows the signals, which are active during that state. If a signal is not shown, it is not active. For example, if a state shows UP, the motor will be controlled such that the fabric will go up. If UP is not shown in the following state, the UP signal is switched off which will cause the motor to stop. All text surrounded by a rectangle shows a defined state. All text not encircled or not surrounded by a rectangle sets forth a condition, which if tests TRUE, will move control to the corresponding state.
2. Delay times T1 and T2 have the following relationship: T2 is greater than or equal to T1. Indications for these times are T1=T2=1 second. Delay time T3 is for a sleep cycle: when there is no action during time T3, the system will go into SLEEP mode. (Preferably T3=2 seconds). T4 is a Release time: the motor should rotate in the down direction during time T4 to release the fabric. T4=0.4 seconds est. @2": 0.416 ft/sec=5 in/sec (DOWN 60"×60" shade at 10V), for approximately 2" of relaxation this is 0.4 seconds.
3. The first four states after Power Up are to initialize the MD'. This is to determine whether the MD' is mounted in the right way into the head-rail and to bring the shade into the "working range" of MD'.
4. MD_On=Send Signal to IR emitter in MD optics
5. MD_Off=NOT(MD_On)
6. IR_Off=NOT(IR_On)
7. MD_Active means that light pulses are detected during rotation.
8. IR_Signal means that a valid IR-signal is detected. Together with IR_Dir flag it represents the output flag of the IR_Receive routine. This routine checks whether there is a valid IR signal. If so, it checks whether the parity is acceptable and whether the group number is set. If the group number was not set yet, it will set the group number according to the received group number. Finally it will check the direction bit and set the IR_Dir flag accordingly.
9. IR_Signal* means that the originally received signal should have stopped for a short time and started again, for example, the user should have released the button on the remote control transmitter and pressed it again.
10. Man_Tug means that the manual tug input is valid; the manual tug operation is performed.
11. DOWN=Rotate motor in a first direction UP=Rotate motor opposite to DOWN.
12. POS:=UNKNOWN means windows fabric is somewhere between the top and the bottom of its range.
13. POS:=TOP means window fabric cannot rise any higher.
14. POS:=BOTTOM means window fabric cannot move any lower.

In one preferred embodiment, the Invention is comprised of a motor 4 in the head rail 3 engaged with a driver mechanism 7, electronic circuits for decoding control signals and allowing drive transistors to rotate the motor in different directions, as well as electronic circuits for the optical detection and control of the drive apparatus (FIGS. 13, 14, 15, 17, and 18).

One preferred embodiment of the Invention comprises a torque sensing system that acts in part as a sensor to detect whether the torque difference between the drive shaft 5 driven by a motor 4 and the driven shaft 17 that lifts a load, for example, a shade, is outside of a predefined nominal torque range. In one embodiment, this is done by means of three discs and one or more springs, which block infrared light as long as the torque difference is within the nominal range. As soon as the torque difference is outside the nominal range, pulses of infrared light will be detected. Detection is done by means of an optical pair 34 (FIG. 17).

In one embodiment, without limitation, the torque sensing system of the Invention may comprise a roller shade whereby changes in relative torque to the shade effect changes in movement of the shade, in one example only, when the shade encounters an obstruction during its travel.

In one preferred embodiment, the torque sensing and control system of the Invention is comprised of a driver 16 and two driven parts 17. One or more compression springs 24, 25 (e.g., FIGS. 19, 20) engage rotationally between the driver 16 and the driven parts 17, so that when the shade is raised, there is a pre-loading of torque on the compression springs. In similar fashion, when the shade is extended, the torque is reduced, and the pre-loading is also reduced.

Slots on the outer disk of the disk apparatus are then allowed to engage within an electronic optical circuit 20. Light from the optical pair 34 passes through aligned disks in the mechanism shutting off the motor 4. Thus, when there is a low or no torque presence, the pre-loading disappears, and the light transmission through slots in the disk is detected and signals the motor to shut-off. See U.S. Pat. No. 6,116,320, which is incorporated herein by reference in its entirety.

Figure 19:
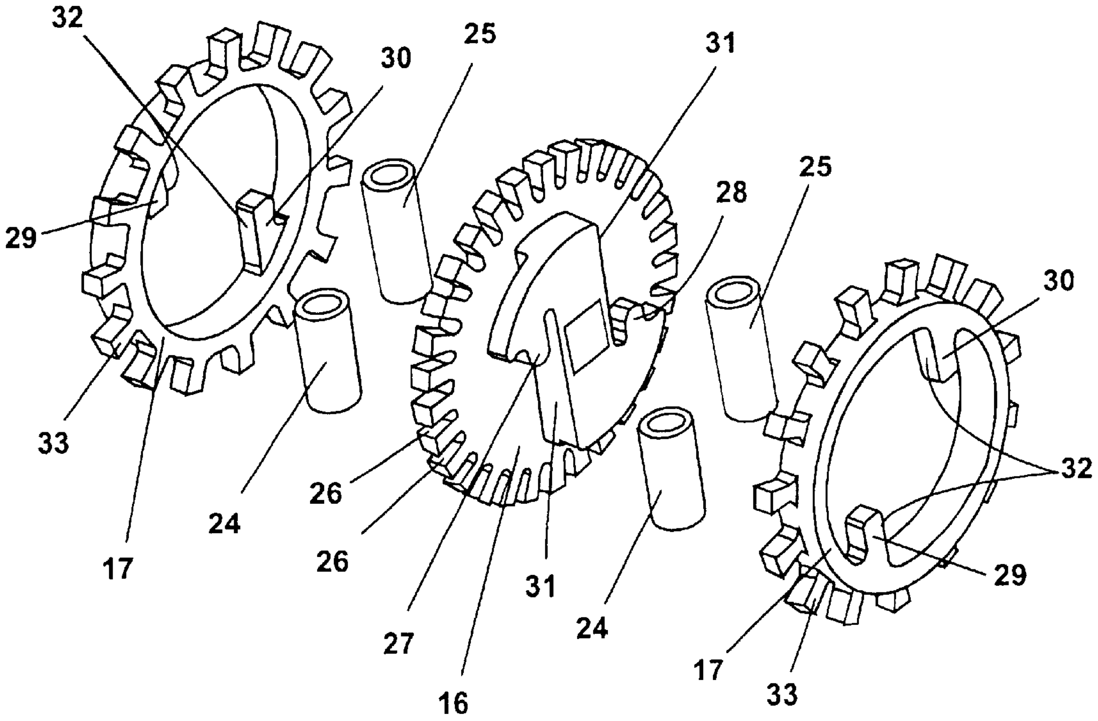
FIG. 19 is an expanded view of one embodiment of the MD' driver, driven parts and compression springs in the Invention.

In one preferred embodiment, and without limitation, the Invention is comprised of two sets of low-end springs 24, or “light” springs, and two sets of compression springs 24, or “heavy” springs (FIG. 19). The light springs 24 are used for pre-loading or shut-off detection at the bottom of the shades and the heavy springs 25 are used at the top. Starting when the shade 1 is in the closed position, as the shade is raised, the springs are pre-loaded. The shade begins to travel upwards, and the small springs are compressed. The load proportionally increases with the additional weight of the fabric, and as the shade reaches the top position, there is a locking up, preventing no further travel. At the top position, the torque in the system begins to spike, and that spiking engages the heavy compression springs, which then align the slots to cause the light to go through the related slot. Thus, there is a high-end range and a low-end range where light can pass through the slots, as well as a middle range for continuous shade and operation up and down where no light passes.

In similar fashion, and by way of example only, as the shade is lowered and contacts an obstacle, the torque is reduced as the obstacle supports the shade and weight is reduced on the lift cord. The interruption in torque is sensed by the Invention, and the shade is shut off. The Invention may be used in any lift or travel mechanism, by way of examples only and without limitation, whether for cellular lift, roller shaft, or other applications.

In one embodiment, the Invention comprises a T-touch cable seat control system that is comprised of a spring (not shown) inserted between the motor 4 output shaft and the drive shaft 5 that connects to the driver of the shut-off mechanism. As the user pulls down on the moving rail 2, the light springs 24 and heavy springs 25 in the mechanism are compressed, and the spring between the motor 4 and drive shaft 5 are engaged. Thus, there is a cumulative loading of a larger force.

The Invention compares torque as a relative differential between the driving motor and the lifting mechanism of the shade. Whenever this relative torque differential is outside of an appropriate range relative to the application, size range, and other characteristics of the embodiment, the motor is shut off from the system. This feature prevents damage to either the motor 4 or the shade 1 during situations where control is required, for example, at the top and bottom positions, and with obstacle detection. At the top position of the shade, the Invention shuts off the motor to prevent damage to the motor (e.g., rotor lock), damage to the shade (e.g., torn lift cords), or system power consumption (e.g., current spikes). At the bottom position of the shade, the Invention shuts off the motor to stop the shade in the fully closed position before it begins lifting the shade back up in the reverse direction of the designed lift system. With obstructions during upward travel, the Invention shuts off the motor for the same reasons, with the same concept (maximum torque differential) as when the shade runs into the top head rail. With an obstruction during downward travel, the Invention shuts off the motor with the same concept (minimum torque differential) as when the shade reaches the bottom, but for different reasons.

The Invention comprises a mechanical component that measures torque differentials between a driving rotation and its driven output. The torque differential is measured by an amount of rotation against a spring action during which the Invention component is either in its rotational driven motion or stopped in motion. This range of rotational distance within the spring’s motion is determined with an upper and lower limit relative to the characteristics of the embodiment, by way of examples only, type and weight of shade, spring size, and radius of lifting shafts. The upper limit is able to recognize the maximum amount of allowable torque between the driving rotational source and the driven output, while the lower limit recognizes the least amount of allowable torque. The maximum and minimum allowable torque are directly proportional to the lifting weight capacity, based upon a given lever arm.

The lifting weight limits can be used to recognize the upper and lower limits of the shade. As the shade is lifted, more torque is required to lift the increasing weight. As the shade is lowered, less torque is required to lift the decreasing weight. At the complete bottom position of the shade, the lift cords are fully unwound and the lever arm would be zero. This zero point can be recognized by the Invention at the point that there is no tension on the spring. At the complete top position of the shade, the lift cords are completely wound up and the torque increases up to the point of maximum output from the motor. This maximum torque can be recognized by the Invention and set, based upon the amount of spring rotation and the related spring characteristics. Therefore, both endpoints of the shade’s motion can be recognized by the Invention.

The lifting weight limits can also be used to recognize an obstruction on the moving rail of the shade. When the shade is moving down and an obstruction occurs on the moving rail, the lifting torque quickly jumps from the current weight of the fabric to a zero (very minimal) torque. The Invention recognizes this at the point that the spring motion moves from the distance of spring rotation based upon the current shade position to the zero (minimum) point of the spring range. This phenomenon also occurs on the upward motion of the shade. When the shade is moving up and an obstruction occurs on the moving rail, the lifting torque quickly jumps from the current weight of the fabric to a significantly larger torque. The Invention recognizes this at the point that the spring motion moves from the distance of spring rotation based upon the current shade position to the maximum point of the spring range. Therefore, both types of obstruction can be recognized by the Invention.

The upper and lower limits use an electromechanical interface between the mechanical range of the Invention component with an electrical transition to respond to the motor. This mechanical range allows light to pass at each extreme endpoint, while no light travels through between these states. The Invention comprises electronics used to decipher this light passage, such as an optical pair of light-emitting diode with a photo-sensor transistor. When the photo-sensor transistor responds to the light passed from the light emitting diode, then the electronics will either start up or shut off the motor.

As the Invention's components rotate inside the case 7 during the lifting or lowering state of the shade and the maximum or minimum torque differential is encountered, then light will pass through the holes and the rotational spin will eventually reach the electronic optical pairs. Once the light emitted by the opto-emitter is received by the opto-transistor's lens from the flashing rotation of the Invention components, the electronic feedback will shut off the motor.

In one preferred embodiment, the Invention has a delay in reaction from when the minimum or maximum torque differential occurs until the electronic optical pairs receive the flash of light.

By way of example only, and without limitation, in one embodiment (FIG. 19), a 4-compression spring system is used in applications of a multiple take-up lift system. The motor 4 drives a shaft 4 that couples to the optical driver disk 16, which has one or more symmetrical slots 26 because a tighter tolerance of rotation is controllable using the compression spring characteristics. One or more of the driven-side components 17 are hollow so that the optical disk is driven by and connected directly to the driving shaft of the motor. Two different compression springs, light compression springs 24 and heavy compression springs 25, connect to the small nubs 27 and large nubs 28 on the front side and backside of the optical driver disk 16. The other end of the light compression springs 24 and heavy compression springs 25 connect to the small nubs 29 and large nubs 30 of the two optical interrupter driven disks 17. The way in which the compression springs work is that rotation in one direction between the optical disk 16 and the optical interrupter 17 compresses the sum of the light compression spring 24 and the heavy compression spring 25. If the rotation goes in the opposite direction, the springs are forced apart, and to the point of the stop surfaces. These stop surfaces are at the stop surface 31 on the optical disk 16 and the stop surface 32 on the optical interrupters 17. The significant advantage in using compression springs is the smaller amount of allowable distance of rotation. This increases the tolerance in the function of the Invention and allows the optical electronics to respond quicker, with less rotational error. The function is still the same in that the Invention still has the optical disk 16 with symmetrical slats 26 designed to allow the light passage between the electronic optical pairs (not shown). Each of the two optical interrupters 17 has many symmetrical optical blocks 33 on each end of their disks that are coordinated to block the slats 26. The optical electronics would still be fixed within the stationary case housing 7 and positioned to face each other with a gap that allows both of the optical disk 16 and the two optical interrupters 17 to spin freely.

Figure 20:
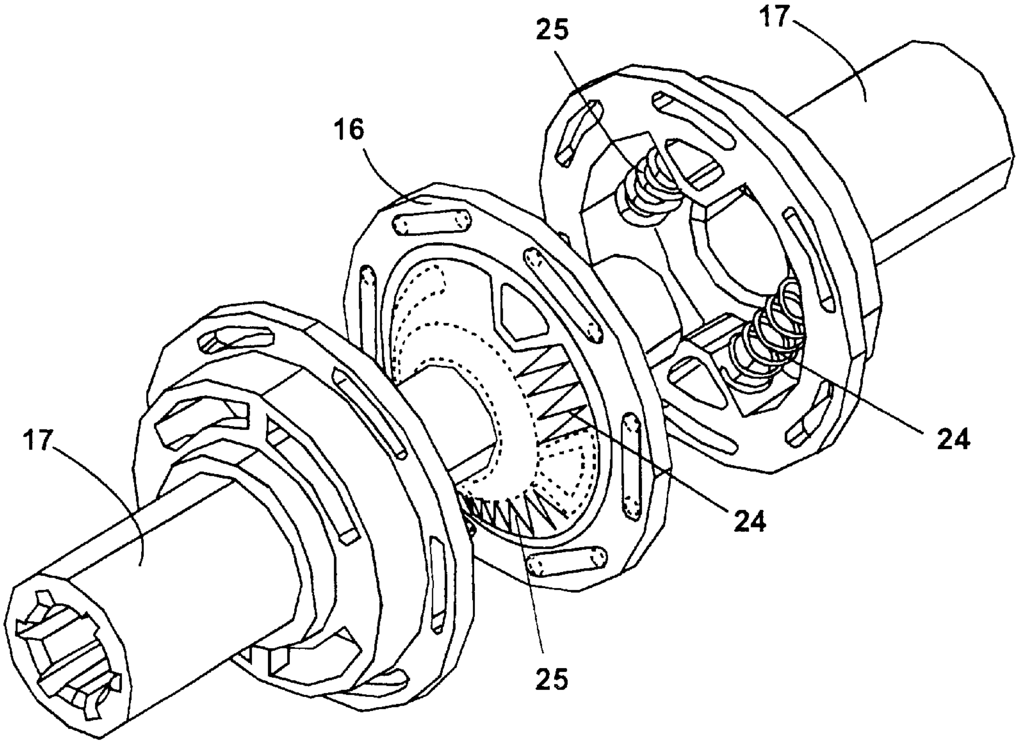
FIGS. 20 and 21 are exploded views of a preferred embodiment of the MD' driver, driven parts and compression springs in the Invention.
Figure 21:
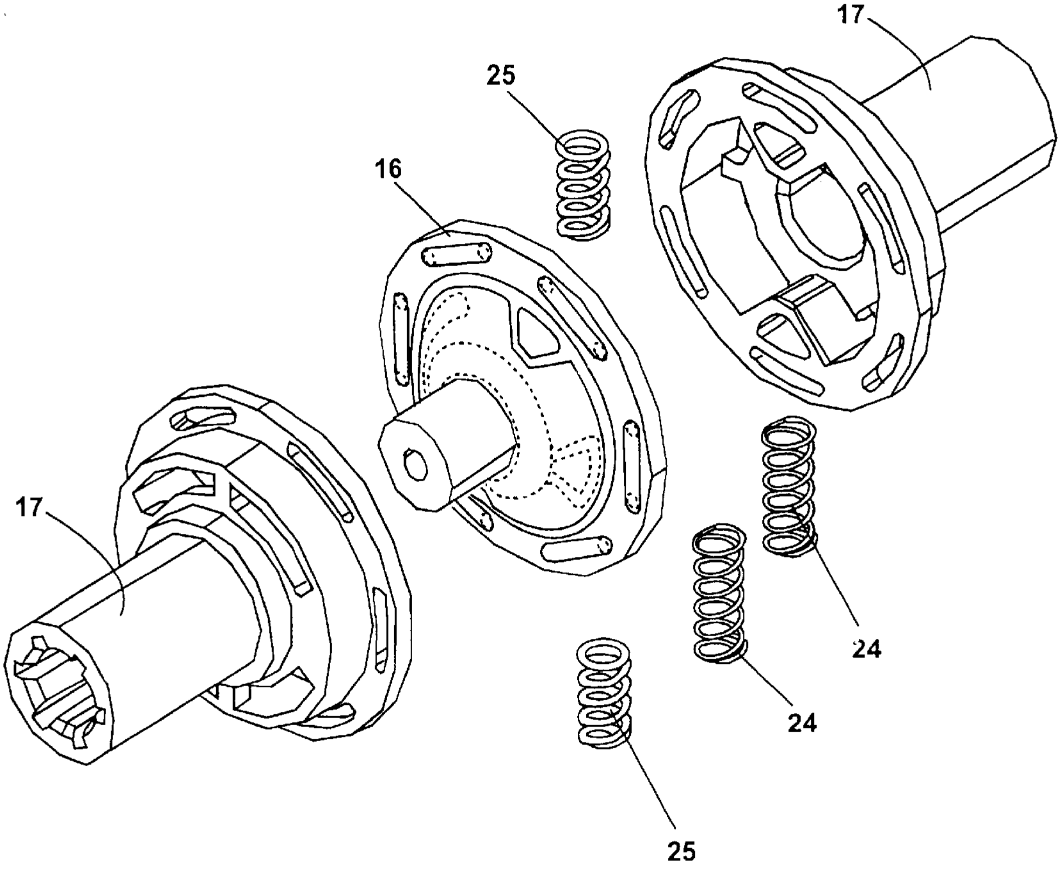

As shown in FIGS. 20 and 21, one preferred embodiment of the Invention comprises a 4-spring system 24, 25 with a driver 16 and two driven members 17 whereby the degree of optical interruption is determined by the relative position of one or more holes and slots in the driver and driven members.

In one embodiment, the 4-compression spring system takes advantage of the compression spring characteristics by using both a light and heavy spring. This advantage increases the overall range of the maximum and minimum torque differential by using a longer, lighter spring that responds during the first stage of the Invention's spring rotation. This beginning range of motion helps determine the lower limit of torque differential. After a minimal amount of distance of rotation; the shorter, heavier spring responds. This heavier spring determines the upper limit of torque differential, due to the summation of both springs.

In one preferred embodiment, the Invention stops the motor anytime a light passage is detected while the shade is moving, and it also runs the motor anytime a light passage is detected while the shade is stopped. The controls allow for a delay in software during any transition, to prevent bouncing disturbances within the shade system, which may activate false light passages within the Invention's mechanics.

The Invention comprises means to recognize its previous direction in order to minimize undesirable movements. For example, if the Invention normally stopped the shade at the fully closed position and the shade were given a manual tug, it could go back down going up in the wrong direction. This might happen before the Invention is triggered to shut off because the electronics are designed to initialize the motor run for a time, by way of example, only two seconds, without looking for pulses (this delay is needed to get the system started). When the Invention is running in the wrong direction, the stops will maintain a light gap to flash the electronics, even though the springs are acting in the opposite direction. This will cause constant triggering by the electronics after the delay has expired. To prevent this situation from occurring in one embodiment, a manual tug may always run the shade in the opposite direction it went previously.

The Invention also comprises means to avoid false activation that may be caused by wind, or any other undesirable interference that may be recognized as a manual tag. To prevent these unwanted situations, the Invention comprises electronic means to observe a certain maintained length of time for a flash so that it is certain that it is a tug.

Figure 22:
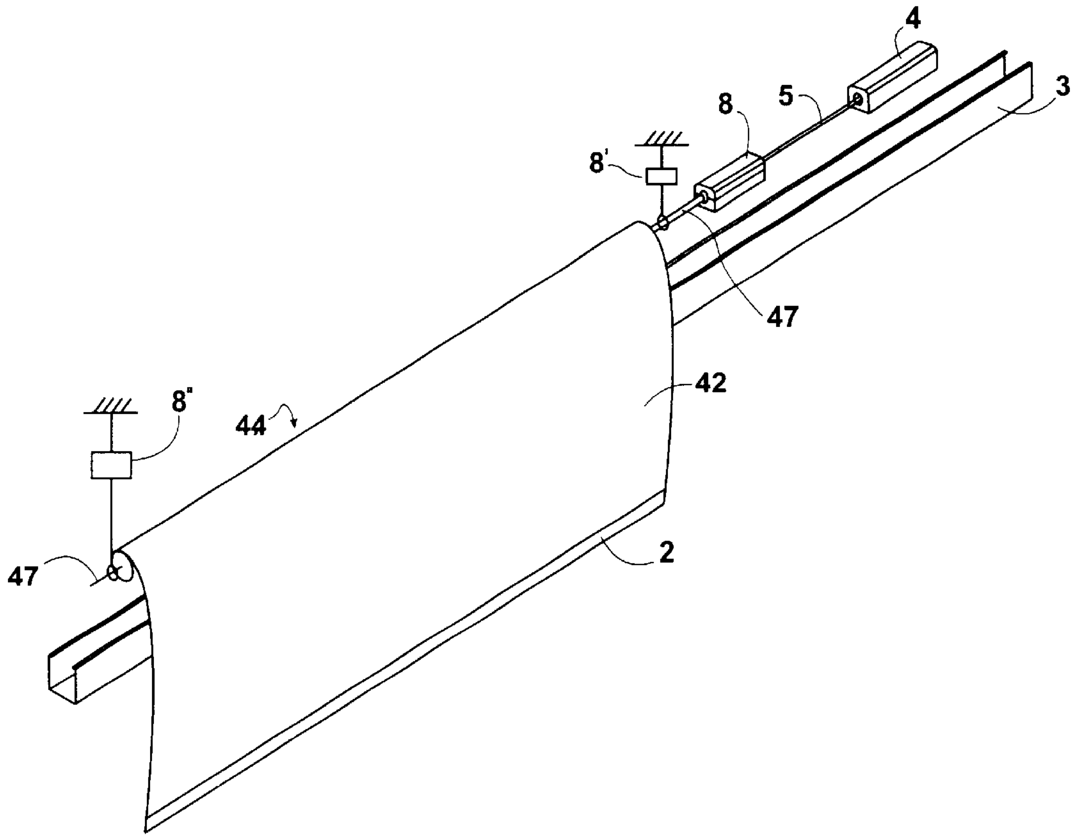
FIGS. 22 and 23 are exploded views of a preferred embodiment of the Invention comprising a motorized cellular lift system with sliding shaft system, torque sensing and control system, and touch control switch mechanism for a shade without lift cords.

In the embodiment shown in FIG. 22, the Invention may also include windows shades, without lift cords, which may be operated by touch control. The touch control system previous described is fully applicable to this embodiment, with the distinction being the type of switch utilized in the touch control system. A user may disturb (i.e. either lift or pull) on the moving rail 2 of a window shade without lift cords in order to actuate a motor 4 to lift or lower the shade 42 (or window covering). This actuation is accomplished through the use of one or more touch controls switch mechanism 8, 8', 8", preferably, located in the head rail 3.

Figure 5:
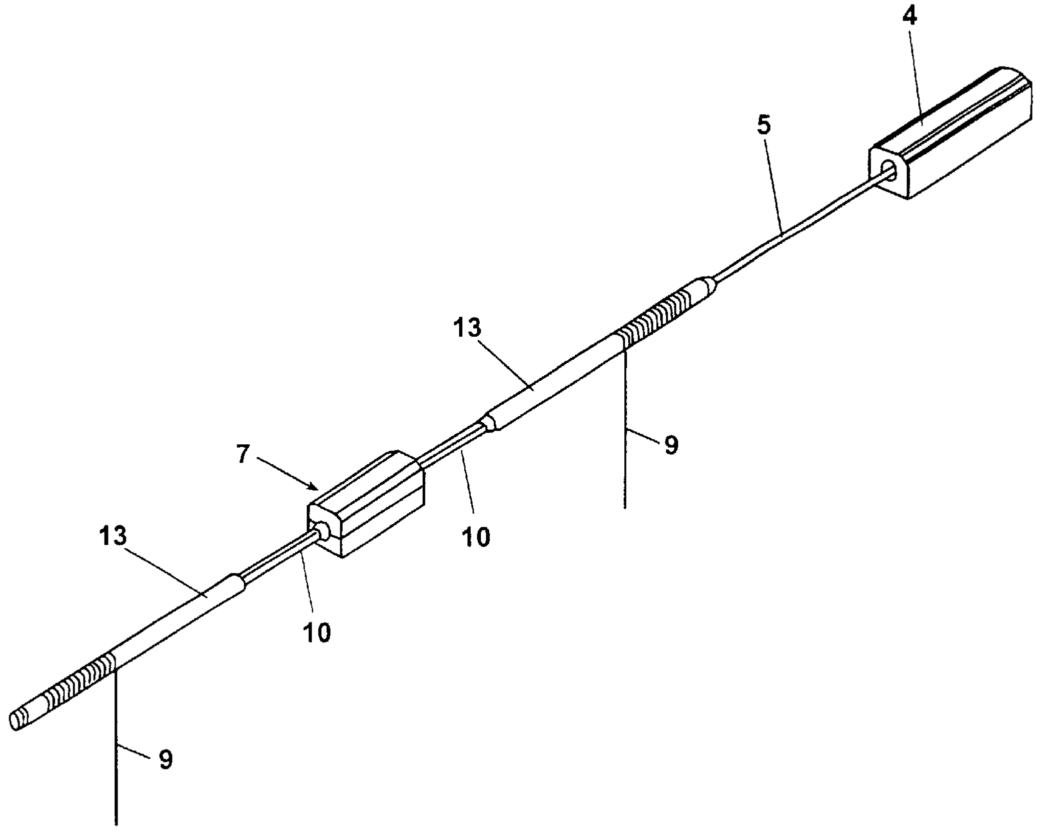
FIG. 5 is an exploded view of a motorized lift system showing the torque sensing and control mechanism and the sliding shaft, without the touch control switch mechanism, shade fabric, or moving rail.
Figure 7:
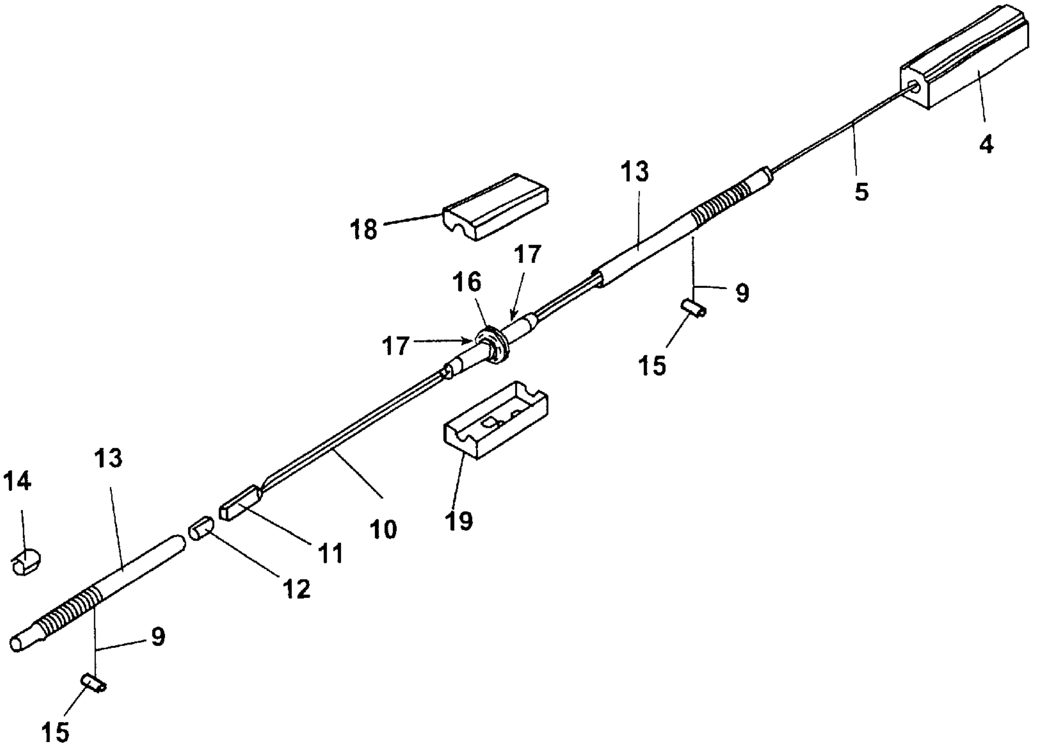
FIG. 7 is a further exploded view showing the sliding shaft lift system connected to the torque sensing and control mechanism and motor.

The switch mechanism 8 shown in FIG. 22 is comprised of the torque sensing and control mechanism previous described (item 7 in FIGS. 5, 6, and 7). The torque sensing mechanism when also used as the switch mechanism 8, 8', 8" is particularly suited for roll-up window shades where the shade is coiled around a roller shaft 44. Namely, in addition to performing its other functions of sensing when the shade has reached the fully open or closed position and detecting obstructions, the torque sensing mechanism 8 can also operate as a touch control switch mechanism to provide touch control for a shade without lift cords.

Specifically as described above, the torque sensor 8 is particularly adapted to sense loads which are outside of a predefined nominal torque range. A manual tug (disturbance) on the moving rail of the shade causes a disturbance in the load seen by the motor which in turn is sensed by the torque sensing mechanism. Depending on the operational state of the motor at the time the tug was applied, numerous outcomes would be possible. For example, if the motor was stationary at the time of the tug, the motor could begin to rotate in a direction opposite to its direction of rotation prior to assuming the stationary state.

In one embodiment, a manual tug will cycle shade movement from (1) up, (2) stop, (3) down, (4) stop, so that the window covering will always move in a direction opposite to that which it previously rotated. As described above, this is accomplished through the use of a means which recognizes the previous direction of the shade.

The motor 4 rotates the roller shaft 44 to open and close the shade 42. The switch mechanism 8 may be located either between the roller shaft and the motor or on the oppose side of the roller shaft from the motor. In the later configuration, the roller shaft may be hollow with the drive shaft 5 of the motor 4 passing freely therethrough, in a manner similar to that shown in FIGS. 4, 5, and 6 for the embodiment including lift cords.

Figure 10E:
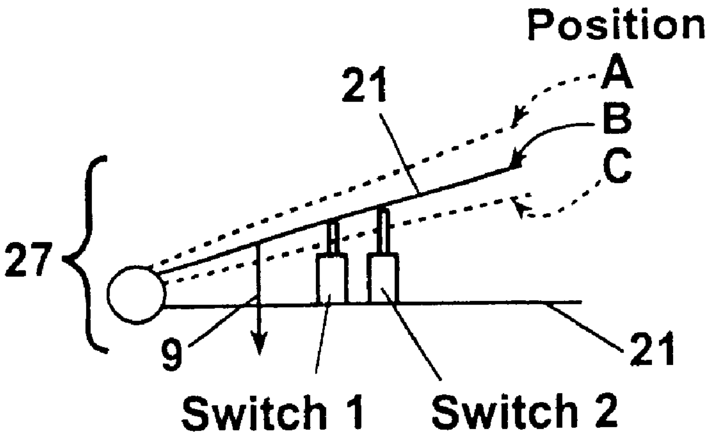
FIG. 10E is a simplified mechanical model of a second embodiment of the touch control switch mechanism.
Figure 10F:
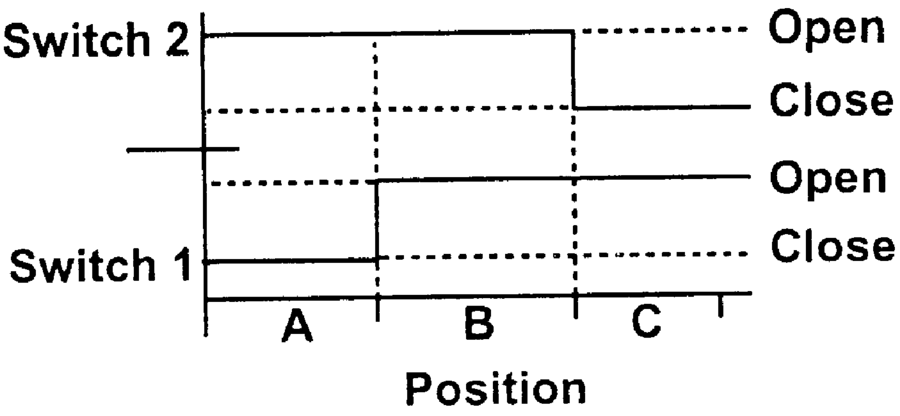
FIG. 10F is a graph showing the state of switches #1 and #2 as a function of the position of member 21.

Another type of switch mechanism 8', 8" which may be utilized with either the window shade with lift cords shown FIG. 1 or with the roll-up shade shown in FIG. 22 may include a spring loaded switch (such as shown in FIG. 10E), a strain gauge or any type of force sensitive switch. Force sensitive switches are well known in the art for being able to sense the force applied in a given direction. Strain gauges are commonly employed as the force sensitive element. Strain gauges operate by passing current through a wire, and then by measuring the variations in electrical resistance of wire as it is stressed. In this embodiment, one or more force sensitive switches 8', 8" are rotatably engaged to the roller shaft of the shade. The force sensitive switch is oriented in a way that allows it to detect a manual tug on the window covering 42. Thus, a force sensitive switch with its axis of sensitivity oriented upwardly, would sense a manual tug in the direction of the force of gravity. Preferably, two force sensitive switches are utilized 8', 8" one at each end of the head rail or at each end of the window covering roller support axis 47.

A manual tug on a shade utilizing a force sensitive switch mechanism 8', 8" serves to operate the shade is the same way a manual tug on shade utilizing a torque sensing switch mechanism 8.

The Invention may also include a counterbalance mechanism for assisting the movement of the shade. One known problem with devices for raising and lower shades using battery operated mechanisms is the limitation on the weight of the shade. When a shade design reaches a certain weight, a battery no longer stores enough power to raise and lower the shade numerous times. For example, battery operated lifting mechanisms have not been practical for use with wood slatted horizontal blinds until now because the small batteries useful in head rails could only raise these blinds a limited number of times before discharging to the point that they become non-functional. This limits the usefulness of batteries battery applications on heavy shades.

One method of overcoming this limitation is to utilize a counterbalance. A similar concept is utilized in double hung windows, in which weights and pulleys, located in the walls, attached to the window sash by ropes, assist in raising the window sash. By closing the window, the operator stores potential energy in the weights, which is released when the window is opened. This concept significantly reduces the force needed to open double hung windows. However, with space around window shades at a premium, the use of weights and pulleys is impractical. Further, aesthetic considerations also make weights and pulley impractical because there is not where to hide the weights.

Another common method of storing potential energy, which comports with the space and aesthetic constraints associated with window shades, includes the use of a spring. A particularly useful spring for this Invention is a torsion spring. One type of torsion spring is called a coil spring. Coil springs typically are wound in a spiral pattern in a single plane and are commonly found in watches which require winding.

Figure 23:
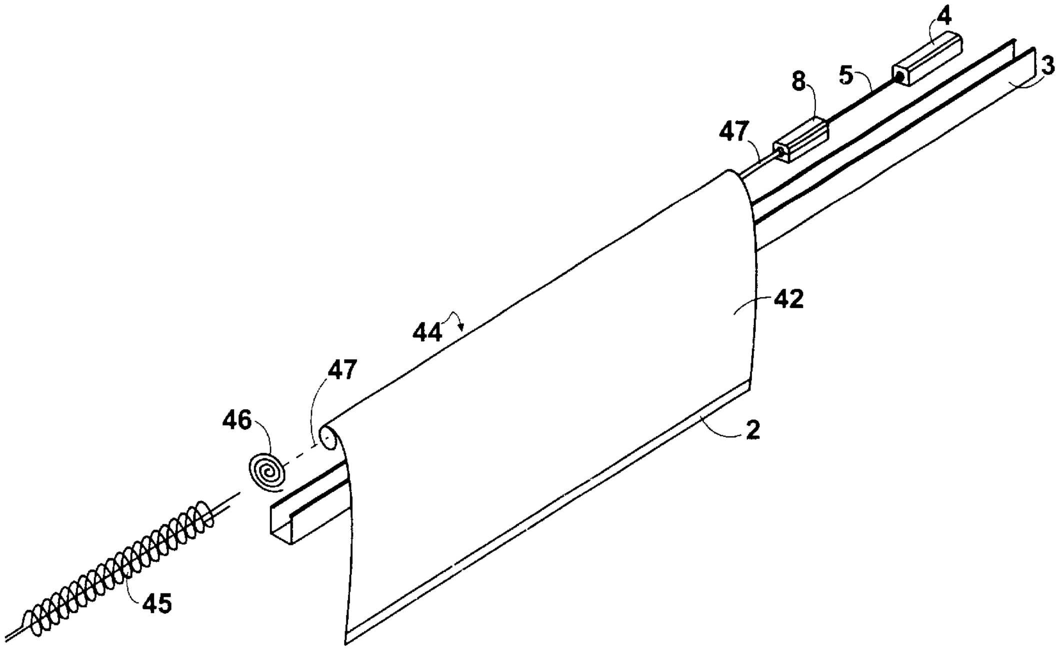

As seen in FIG. 23, by mounting a coil spring 46 such that the coil lies in a plane substantially perpendicular to the axis of rotation of the drive shaft or roller shaft 47, a significant amount of potential energy can be stored in the spring. Specifically, one or more coil springs would be mounted to the drive shaft or roller shaft of a shade such that the center of the coil spring is connected to the drive shaft or roller shaft, while the remaining end of the coil spring is connected to the head rail. As the drive shaft or roller shaft rotates so as to close the window covering, the motor combines with gravity to "wind" the spring thereby imparting potential energy into the coil spring 46. When the drive shaft or roller shaft rotates to lift the window covering, the potential energy in the coil spring is released and assists in the rotation of the drive shaft or roller shaft. The assistance by the coil spring reduces the strain on the battery, thus prolonging the life of the battery and making feasible battery operated lifting mechanisms for window covering previously considered too heavy.

Another useful type of torsion spring 45 is tubular torsion spring. Tubular torsion springs resemble conventional springs yet have a direction of action which is perpendicular to the axis of the spring. A common application for tubular torsion springs is to assist in raising garage doors. One or more tubular torsion springs may be mounted concentrically to the drive shaft or the roller shaft. As the window covering is unfurled, potential energy is stored in tubular torsion spring and energy is released as the window covering is drawn back.

Figure 24A:
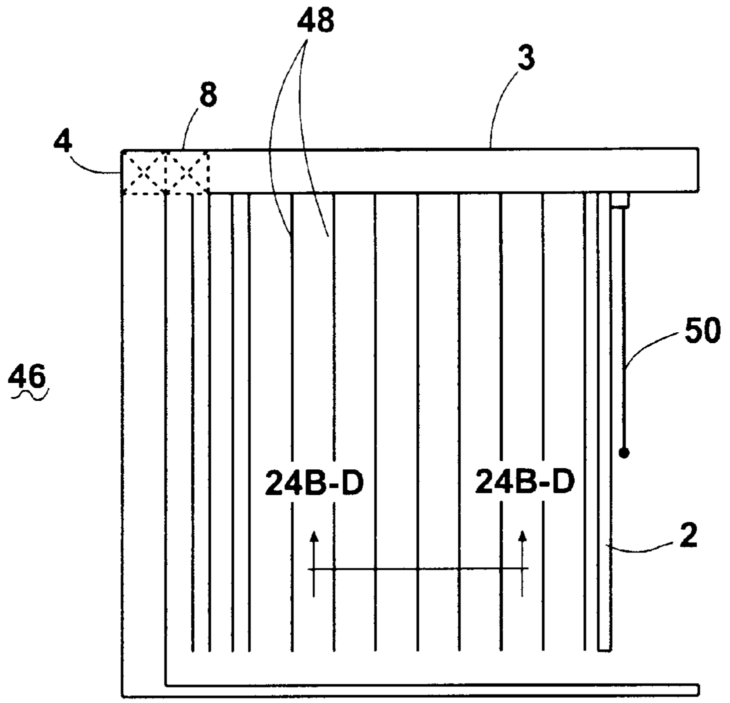
FIG. 24A is a view of a preferred embodiment of the Invention comprising a touch control switch mechanism of a vertical blind.

In the embodiment shown in FIG. 24A, the Invention may also include window coverings which are vertical window coverings (vertical blinds) that may be operated by touch control. The touch control system previous described is fully applicable to this embodiment. In a touch control system, a user disturbs (i.e. push or pull) the moving rail 2 of a vertical blind 46 in order to actuate a motor 4 to move the slats 48 either right or left. This actuation is accomplished through the use of one or more touch control switch mechanisms 8, preferably, located in the head rail 3. Alternately, the user may disturb a control wand 50 attached to the moving rail 2 of the vertical blind. Alternately, the moving rail may be absent and the leading edge of the vertical blind or control wand may be disturbed to actuate the motor.

In addition to performing its other functions of sensing when the window covering has reached the fully open or closed position and detecting obstructions, the torque sensing mechanism 8 can operate to provide touch control for vertical blinds.

As described above, the torque sensor is particularly adapted to sense loads which are outside of a predefined nominal torque range. A manual tug on the moving rail or control wand of the vertical blind would be cause a disturbance in the load which in turn would be sensed by the torque sensing mechanism. Depending on the operational state of the motor at the time the tug was applied, numerous outcomes would be available. For example, if the motor was stopped at the time of the tug, the motor could start up and vice versa.

In one embodiment, a manual tug will cycle vertical blind movement from (1) right, (2) stop, (3) left, (4) stop, so that the window covering will always move in the opposite direction that it previously went. This is accomplished through the use of a means which recognizes the previous direction of the shade.

Figure 24D:
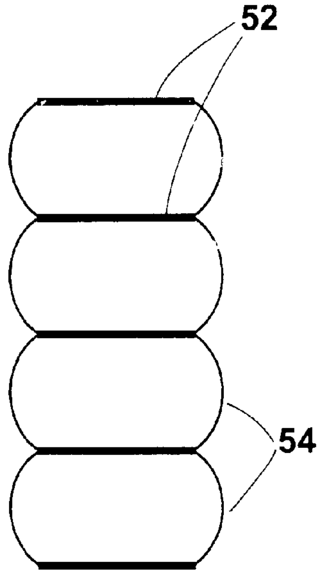
FIG. 24D is a top view of a vertical blind with a fabric cell configuration.
Figure 24B:
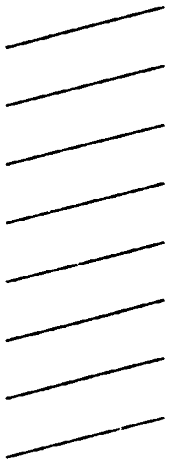
FIG. 24B is a top view of a vertical blind having a traditional slat configuration.
Figure 24C:
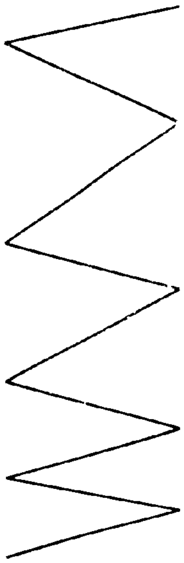
FIG. 24C is a top view of a vertical blind having a Z-shaped configuration.

The use of touch control with vertical blinds is not limited by the type of fabric or material selected for use in the vertical blinds. For example, a blind utilizing vertical slats is useful (see FIG. 24B), as is a blind utilizing a pleated or Z-shaped configuration (see FIG. 24C). Further, a blind utilizing a fabric cell formation is also useful. A fabric cell configuration is shown in FIG. 24D, where generally opaque slats 52 are attached at the edge via a translucent material 54.

Figure 25:
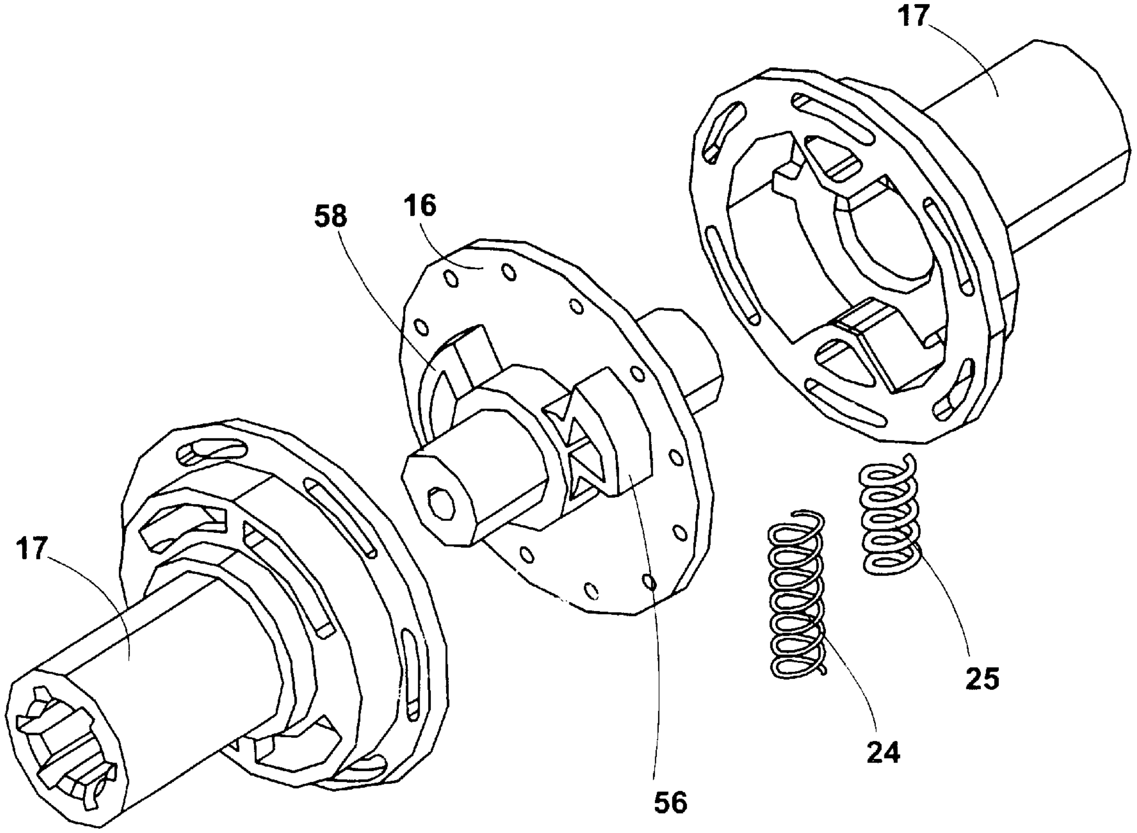
FIGS. 25 and 26 are exploded views of a preferred embodiment of the driver, driven parts and compression springs of the Invention.
Figure 26:
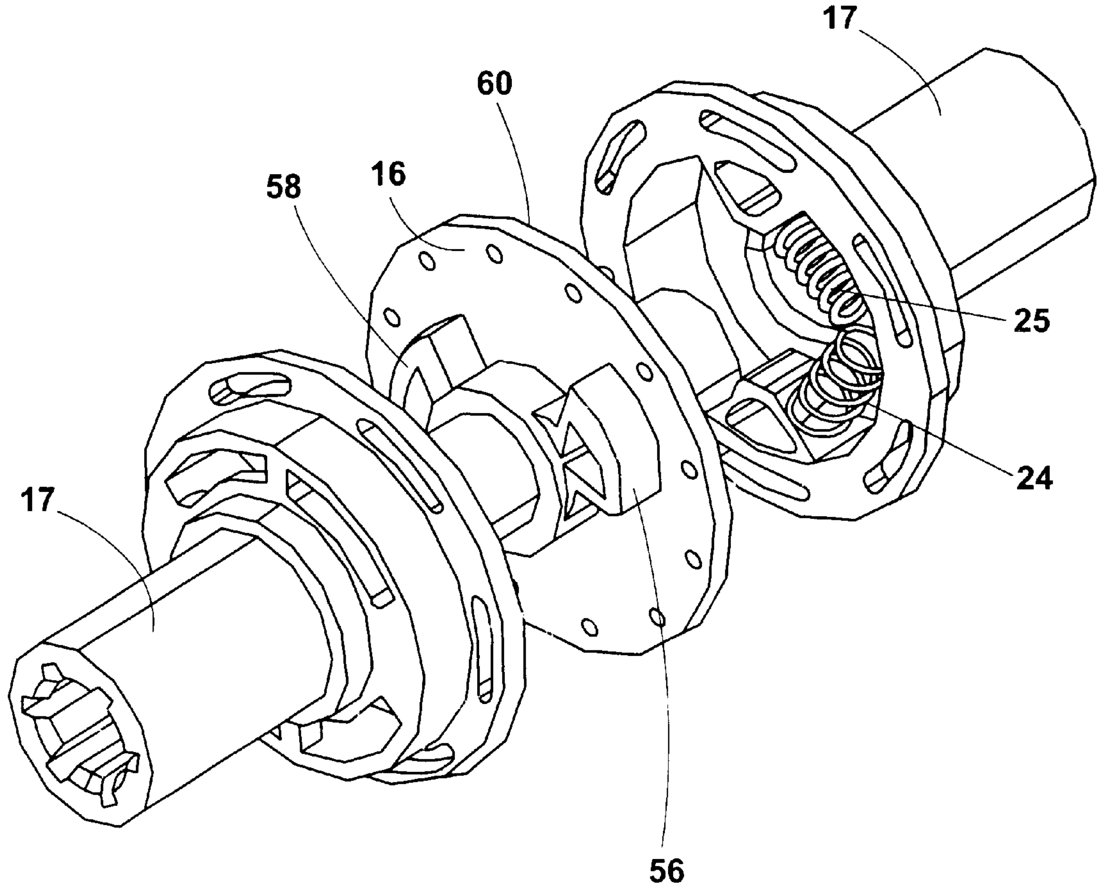

As shown in FIGS. 25 and 26, one preferred embodiment of a torque sensor of the present invention is the WIP design embodiment shown in FIGS. 25 and 26. The WIP design embodiment comprises an opposing spring system 24, 25 (only 2 of the four springs are shown in FIGS. 25 and 26) with a driver member 16 and two driven members 17 whereby the degree of optical interruption is determined by the relative position of one or more holes and slots in the driver and driven member. In this embodiment of the torque sensor, the springs 24, 25 are oriented so that they oppose each other, meaning that as one spring is compressed, the other spring is uncompressed. This opposed orientation is more tolerant of component variability often seen in production environments and provides a consistent operation of the torque sensor over a wider window covering weight range than that offered by the design set forth in FIGS. 19–21 (MD' design).

WIP vs. MD'

Figure 27:
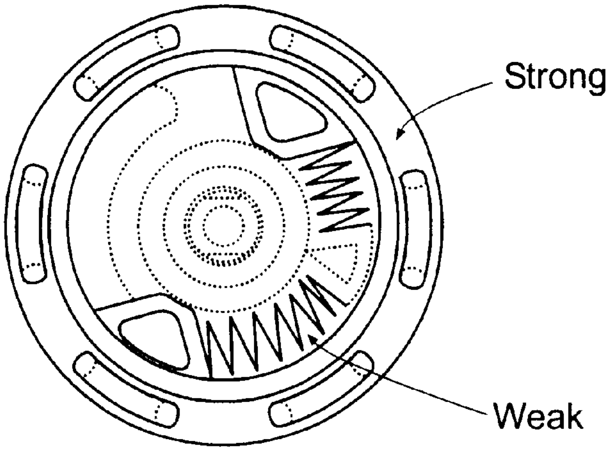
FIG. 27 is a partial phantom view of one half of the WIP torque sensor.
Figure 28:
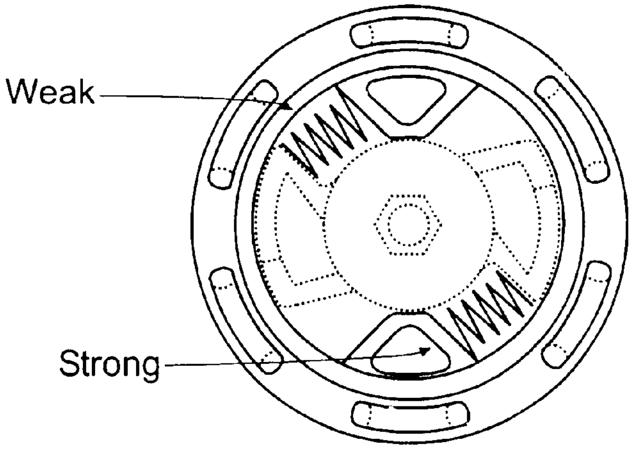
FIG. 28 is a partial phantom view of one half of the MD' torque sensor.

Now referring to FIGS. 27 and 28, the components of the WIP system are the same as the MD' system with the exception of the design of the driver 16 and spring orientation. The orientations of the springs in each design, is set forth in FIGS. 27 and 28.

In the MD' design, the two springs (weak spring and strong spring) act in the same direction of rotation (for a given torque exerted by driver 16, they are simultaneously compressed, or they are simultaneously uncompressed). However, in the WIP design, the springs act in opposite directions when a torque is exerted on the assembly (for a given torque exerted by driver 16, if one spring is in a compressed state, the other spring is in a uncompressed state). For the purposes of discussion, when the terms compressed and uncompressed state are used, they are in reference to the state of the springs when no load is present on driver 16. They are not in reference to the state of the springs when they are not placed into the assembly of FIGS. 19–21, 25–28. This distinction is important primarily because in the WIP design, both the strong and the weak spring are pre-loaded in their rest position. Thus, when there is no torque present on driver 16, both the strong and the weak spring are compressed (with respect to their free standing state).

There are five stages of operation of a window covering system: lifting, hitting top, lowering, hitting an obstacle, and hitting bottom. In the MD' device, during the lifting stage, both the weak and the strong springs keep the system within its predefined nominal torque range (predefined nominal torque range is defined in conjunction with the discussion of FIGS. 17–21). The maximum amount of weight that can be lifted by the system is limited to the combination of spring constants of the weak and the strong springs. When the window covering hits the top, the combined torque provided by the weak and the strong springs in addition to the torque due to the weight of the window covering must be overcome by the motor in order for the MD' system to experience a torque which exceeds its predefined normal torque range. When the MD' system is forced outside of its normal predefined torque range, the light from the optical pair 34 passes through the aligned openings in the driver 16, and the two driven members 17 (see FIG. 20). This passage of light is detected by the sensor portion of the optical pair and is used as a signal to stop the motor.

During the lowering stage, the motor is effectively supplying a reverse torque to the system allowing the shade to fall at a predetermined speed. If the motor was not present, the shade would fall at a much higher rate because of the absence of reflected motor drag. Neither the strong or the weak springs keep the MD' design in its working range during this stage. This causes the system to fall out of its working range thereby allowing the optical pair to sense that the window covering is out of its normal torque range which thereby causes the system to stop the motor. The only mechanism which tends to hold the MD' system in its nominal torque range is the friction between the driven member 17 and the driver member 16. This friction allows the system to operate correctly only when adding excess weight to the bottom of the window covering. This added weight increases the force due to friction which holds the MD' design in its working range.

When the window covering hits an obstacle, the torque of the motor forces MD' out of its nominal torque range. The torque of the motor must be greater than the torque "holding" MD' in its working range. In this case, the torque of the motor overcomes the opposing torque due to friction.

When the shade hits bottom, the torque seen by the MD' prime unit temporarily is zero (because the lever arm between the driven members and the window covering temporarily passes through a vertical orientation thereby resulting in zero torque exerted on the driven members 17). When the system recognizes this zero torque condition, it stops the motor.

If the force due to friction is inadequate, the torque "holding" MD' prime in its working range is overcome too easily causing the motor to force MD' out of its working range during the lowering stage.

WIP Operation

In some applications, the WIP design is superior to the MD' design because the WIP design does not rely on the friction between the driven disk and the driver disk to hold the torque sensor in its working range. Specifically, during the lifting stage, the strong spring keeps the WIP device in the predefined normal torque range. The maximum amount of weight that can be lifted by the WIP device is limited by the spring constant of the strong spring alone.

When the window covering hits the top, the torque provided by the strong spring plus the torque due to the weight of the shade is overcome by the motor in which case the WIP device is forced out of its predefined nominal torque range which is sensed by the sensing electronics and in turn the motor is stopped.

During the lowering stage, the torque of the motor is a reverse torque on the WIP device. The torque caused by the weak spring must be equal to or greater than the motor's reverse torque. This will allow the weak spring to keep the WIP device in its predefined nominal torque range.

When the window covering hits an obstacle, the torque of the motor forces the WIP device out of its predefined nominal torque range. In this case, the torque of the motor overcomes the opposing torque due to the weak spring and a motor cutoff condition is signaled.

When the window covering hits bottom, a zero torque condition is experienced (as explained above), and the WIP device recognizes the change in torque and stops the motor.

The WIP device uses the strong spring during the "lifting" and "hitting top" mode and uses a weak spring during the "falling" and the "hitting bottom" mode. By making use of two different springs depending on the direction of rotation, the system is capable of better, more consistent, control.

The primary advantage that the WIP device has over the MD' device is that the WIP device has the ability to consistently reach the full drop length of the window covering. The only way that the MD' device could consistently reach the full drop length of the window covering (and shut off consistently) was by adding weights to the bottom rail. Although in many instances adding weight may be a satisfactory approach, the presence of the additional weight reduces battery life and in some instances is not feasible because of the limited available space for additional weights in the bottom rail.

The advantage that the MD' device has over the WIP device is that the MD' has a quicker response to an obstacle than the WIP device. However, the WIP response time to an obstacle is acceptable.

Figure 29:
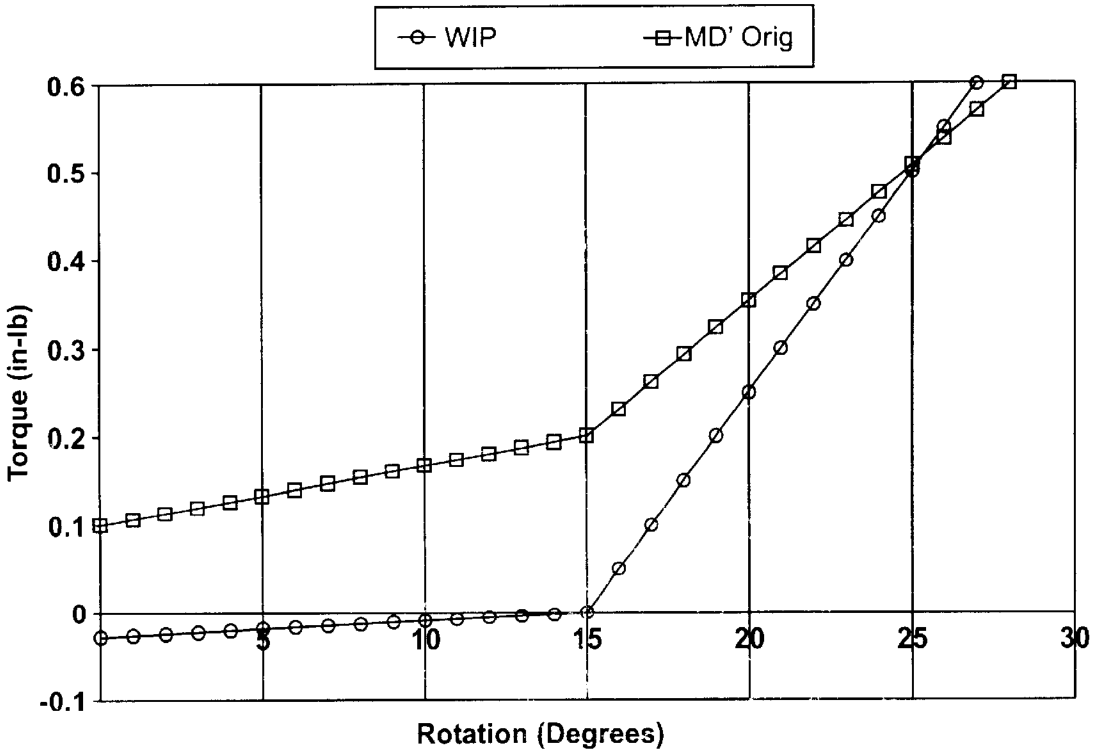
FIG. 29 is a graph of the degrees of rotation and points of spring engagement for the WIP design and the MD' design.

FIG. 29 is a graph showing the degrees of rotation and points of spring engagement for the MD' design and the WIP design.

Preferred embodiments of the present Invention have been disclosed. A person of ordinary skill in the art would realize, however, that certain modifications would come within the teachings of this Invention, and the following claims should be studied to determine the true scope and content of the Invention. In addition, the methods and structures of the present Invention can be incorporated in the form of a variety of embodiments, only a few of which are described herein. It will be apparent to the artisan that other embodiments exist that do not depart from the spirit of the Invention. Thus, the described embodiments are illustrative and should not be construed as restrictive.

What is claimed is:

1. An apparatus for moving a window covering, comprising:

an electric motor, a drive shaft operably connected to the motor, and to the window covering, a sensing mechanism coupled to one of the window covering or the motor for sensing a disturbance exerted on said window covering, electronic circuit coupled to said sensing mechanism and said electric motor for controlling the movement of said window covering in response to a detection of a disturbance by said sensing mechanism, wherein said electronic circuit includes means for controlling said motor to move in a first direction in response to a detection of a first disturbance by said sensing mechanism, thereafter, in response to a detection of a second disturbance by said sensing mechanism, said means for controlling said motor stops all movement of said motor, thereafter, in response to a detection of a third disturbance by said sensing mechanism, said means for controlling said motor moves said motor in a second direction, wherein said first and second directions are opposite to one another, wherein said sensing mechanism is a selected from the set including, strain gauges, spring loaded switches, or torque sensing devices, wherein said sensing mechanism is attached at least one of a head rail which houses said motor, a control wand attached to said window covering, or a moving rail portion of said window covering.

2. The apparatus of claim 1, wherein said sensing mechanism is a torque sensing device placed between the motor drive shaft and the window covering.

3. The apparatus of claim 2, wherein said sensing mechanism is attached to a roller support axle of said window covering.

4. The apparatus of claim 3, wherein said sensing mechanism includes two sensing portions, wherein each sensing portion is attached to a respectively associated end of said roller support axle.

5. The apparatus of claim 1, wherein said sensing mechanism includes two sensing mechanisms, wherein each sensing mechanism is attached to said head rail.

6. The apparatus of claim 1, wherein said sensing mechanism is positioned to detect a vertical disturbance exerted against a horizontally deploying window covering.

7. The apparatus of claim 1, wherein said sensing mechanism is positioned to detect horizontal disturbance exerted against a vertically deploying window covering.

8. A torque sensing apparatus, comprising:

a drive disk, a driven disk, at least two springs coupled between said drive disk and said driven disk, said springs oriented so as to oppose one another when a torque is generated between the drive disk and the driven disk, wherein said at least two springs have different spring constants.

* * * * *